US012804711B2

(12) United States Patent
Chen et al.

(10) Patent No.: US 12,804,711 B2
(45) Date of Patent: Nov. 17, 2026

(54) METHODS AND ARRANGEMENTS FOR DIRECTIONAL CHANNEL ACCESS

(71) Applicant: Intel Corporation, Santa Clara, CA (US)

(72) Inventors: Cheng Chen, Camas, WA (US); Laurent Cariou, Milizac (FR); Po-Kai Huang, San Jose, CA (US); Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 16 days.

(21) Appl. No.: 17/561,138

(22) Filed: Dec. 23, 2021

(65) Prior Publication Data

US 2022/0116994 A1 Apr. 14, 2022

(51) Int. Cl.

*H04W 74/0808* (2024.01)
*H04B 7/0426* (2017.01)
*H04W 72/044* (2023.01)
*H04W 80/02* (2009.01)

(52) U.S. Cl.

CPC ........ *H04W 74/0808* (2013.01); *H04B 7/043* (2013.01); *H04W 72/046* (2013.01); *H04W 80/02* (2013.01)

(58) Field of Classification Search

CPC ........... H04W 74/0808; H04W 72/046; H04W 80/02; H04W 72/0446; H04W 24/08; H04W 72/1221; H04B 7/043; H04B 7/0413; H04B 7/0669; H04L 1/1854

USPC .......................................................... 370/329

See application file for complete search history.

(56) References Cited

U.S. PATENT DOCUMENTS

| | | | | |
|---|---|---|---|---|
| 10,433,337 | B2 * | 10/2019 | Choi | H04W 72/542 |
| 2017/0064708 | A1 * | 3/2017 | Noh | H04L 5/0023 |
| 2017/0303314 | A1 * | 10/2017 | Cariou | H04W 74/0808 |
| 2018/0115996 | A1 * | 4/2018 | Si | H04W 74/0808 |
| 2020/0107393 | A1 * | 4/2020 | Chu | H04W 76/15 |
| 2021/0051714 | A1 * | 2/2021 | Seok | H04W 80/08 |
| 2021/0235447 | A1 * | 7/2021 | Bang | H04W 72/0453 |

(Continued)

OTHER PUBLICATIONS

IEEE Standard for Information Technology—Telecommunications and Information Exchange between Systems Local and Metropolitan Area Networks—Specific Requirements—Part 11: Wireless LAN Medium Access Control (MAC) and Physical Layer (PHY) Specifications—IEEE Std 802.11—2020.

(Continued)

*Primary Examiner* — Jae Y Lee
*Assistant Examiner* — Haeshil Jessica Choi
(74) *Attorney, Agent, or Firm* — KDW FIRM PLLC

(57) ABSTRACT

Logic to place one or more protocol data units (PDUs) in a transmit queue for transmission. Logic to perform a directional clear channel assessment (CCA) for a first sector of a 60 gigahertz (GHz) link, the directional CCA to determine only if the first sector is busy or idle. Logic to determine the directional CCA indicates idle for the first sector. Logic to cause transmission of the first PDU to the STA via the first sector of the 60 GHz link based on the directional CCA. Logic to receive an acknowledgement (ACK) of receipt of the PDU from the STA. Logic to perform a directional CCA for a second sector of the 60 GHz link. And logic to communicate via the first sector and the second sector independently.

25 Claims, 17 Drawing Sheets

(56) References Cited

U.S. PATENT DOCUMENTS

| | | | | |
|---|---|---|---|---|
| 2022/0312482 | A1* | 9/2022 | Niu | H04W 16/28 |
| 2023/0104446 | A1* | 4/2023 | Ajami | H04W 74/0808 370/329 |

OTHER PUBLICATIONS

IEE P802.11ay/D7.0 Dec. 2020—Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specification—Amendment 2: Enhanced throughput for operation in license-exempt bands above 45 GHZ.

IEE P802.11ay/D5.0 Oct. 2019—Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specification—Amendment 2: Enhanced throughput for operation in license-exempt bands above 45 GHz.

* cited by examiner

METHODS AND ARRANGEMENTS FOR DIRECTIONAL CHANNEL ACCESS

TECHNICAL FIELD

This disclosure generally relates to systems and methods for wireless communications and, more particularly, to implement directional channel access for directional links for single user and multiple user communications in one or more sectors.

BACKGROUND

The increase in interest in network and Internet connectivity drives design and production of new wireless products. The escalating numbers of wireless devices active as well as the bandwidth demands of the users of such devices are increasing bandwidth demands for access to wireless channels. The Institute of Electrical and Electronics Engineers (IEEE) is developing one or more new standards that utilize Orthogonal Frequency-Division Multiple Access (OFDMA) in channel allocation to increase bandwidth and data throughput capabilities of the devices such as access point stations and non-access point stations, to increase bandwidth and data throughput demands from users. These new standards may require operability with legacy devices and other concurrently developing communications standards.

DETAILED DESCRIPTION OF EMBODIMENTS

Figure 1A:
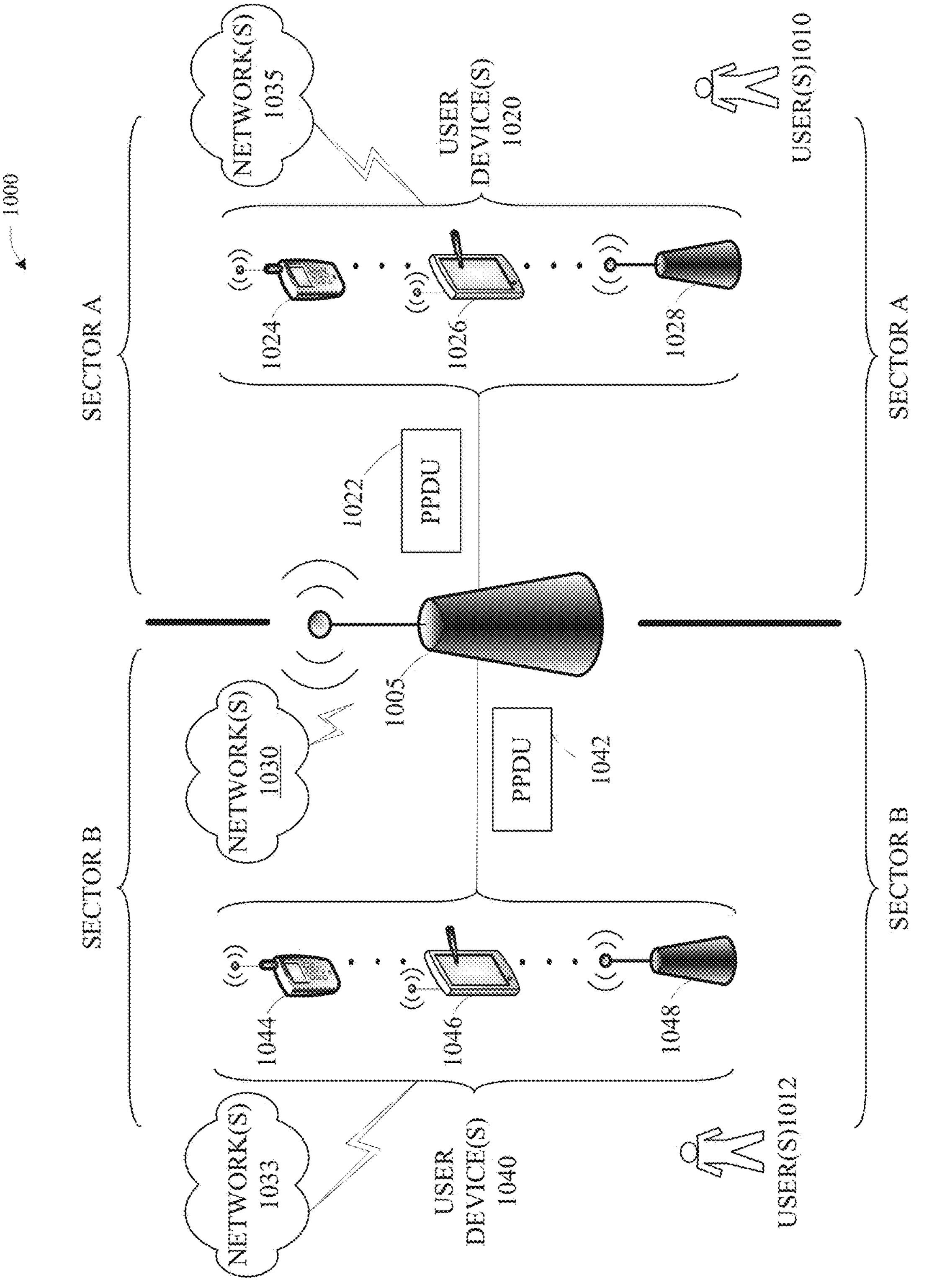
FIG. 1A depicts a system diagram illustrating an embodiment of a network environment for directional channel access logic circuitry, in accordance with one or more example embodiments.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Embodiments may comprise directional channel access logic circuitry to implement directional channel access. Some embodiments may implement directional clear channel assessments (CCAs) for channel access in directional links for single user and multiple user communications in one or more sectors. Contemporary channel access in 60 GHz links is defined in IEEE 802.11ad/11ay and is based on quasi-omni CCA. Quasi-omni CCA relies on energy detection (ED)/power detection (PD) performed in a quasi-omni mode with a quasi-omni antenna pattern. While this quasi-omni mode may detect communications in any direction about the antenna, quasi-omni CCA may also significantly degrade opportunities for simultaneous transmissions that would not interfere with each other. For instance, quasi-omni CCA may check multiple sectors about an antenna for communications to determine if a channel is busy or idle. If the quasi-omni CCA detects communications in one of the sectors about the antenna, the quasi omni CCA reports the channel as busy, preventing transmissions for a backoff count. The backoff count starts after a determination that the channel is idle and restarts if the channel becomes busy before the end of the backoff count. In some circumstances, the quasi-omni CCA may detect communications in a first sector while a protocol data unit (PDU), such as a medium access control (MAC) PDU (MPDU), or a physical layer service data unit (PSDU), is queued for transmission via a second sector. Even if communications in the second sector would not interfere the ongoing communications in the first sector, the quasi-omni CCA reports the channel as busy and causes spectrum utilization efficiency to be lower than warranted by the communication traffic.

Many embodiments comprise directional channel access logic circuitry to define and implement protocols for directional channel access that advantageously avoid interference between communications while advantageously increasing spectrum utilization efficiency. In many embodiments, directional channel access logic circuitry of an access point, herein referred to as an access point multilink device (AP MLD), may implement multiple links on multiple carrier frequencies. In some embodiments, an AP MLD may communicate on each of the multiple links independently and/or concurrently.

Note that STAs may be AP STAs or non-AP STAs and may each be associated with a specific link of a multilink device. For instance, an AP MLD may include a first AP STA for a 2.4 GHz link, a second AP STA for a 5.0 GHz link, and a third AP STA for a 60 GHz link. Note also that a MLD can include AP functionality for one or more links and, if a STA of the MLD operates as an AP in a link, the STA is referred to as an AP STA. If the STA does not perform AP functionality on a link, the STA is referred to as a non-AP STA. MLDs are devices that include multiple STAs associated with multiple links, the AP MLDs operate as APs on active links, and the non-AP MLDs operate as non-AP STAs on active links.

In some embodiments, directional channel access logic circuitry of an AP MLD may implement directional channel access via a directional CCA and/or quasi-omni CCA. In some embodiments, for instance, the AP MLD may perform directional CCA on a 60 GHz link and quasi-omni CCA on another link. In other embodiments, the AP MLD may perform directional CCA on a 60 GHz link and/or quasi-omni CCA on the 60 GHz link.

Similarly, a non-access point station multilink device (non-AP STA MLD), or non-AP MLD, may implement multiple links on multiple carrier frequencies. In some embodiments, for instance, the directional channel access logic circuitry of a non-AP MLD may perform directional CCA on a 60 GHz link and quasi-omni CCA on another link. In other embodiments, the directional channel access logic circuitry of the non-AP MLD may perform directional CCA on a 60 GHz link and/or quasi-omni CCA on the 60 GHz link. For example, in some embodiments, the AP MLD may perform quasi-omni CCA for all transmissions and the non-AP MLD may perform directional CCA for the 60 GHz link with the AP MLD and quasi-omni CCA for one or more other links with the AP MLD.

Typically, an AP MLD may communicate with multiple non-AP MLDs in different directions (or sectors), while a non-AP MLD typically only communicates with the AP MLD in one direction (sector). As a result, directional CCA for a 60 GHz link may work well with non-AP STAs since non-AP STAs expect transmissions only from the AP MLD in one direction. For the AP MLD, directional CCA may work well if the AP MLD:

1. Uses AP triggered-access only for UL traffic. For instance, during at least a predefined time interval, the non-AP MLDs associated with the AP MLD may only transmit an uplink (UL) communication to the AP MLD in response receipt of a trigger frame or the like from the AP MLD. During such time intervals, both the AP MLD and non-AP MLD may always use directional CCA to determine whether a 60 GHz link is busy or idle.

2. Schedules, during at least a predefined time interval, slotted target wake time (TWT) service periods, where in each time slot, the AP MLD only receives communications in one specific direction, or sector, and the AP MLD waits for the non-AP MLD to transmit. Within each slot both the AP and the STA can use directional CCA for channel access.

3. Uses the quasi-omni CCA for channel access. In such embodiments, the non-AP MLDs use directional CCA for channel access in the 60 GHz link.

Note that, in some embodiments, the directional channel access logic circuitry of the AP MLD may be capable of transmitting independently and/or concurrently in two or more non-interfering sectors. In some embodiments, an AP MLD may use directional CCA to determine whether a 60 GHz channel is busy or idle in each of the two or more non-interfering sectors and communicate with STAs in each of the two or more non-interfering sectors. Furthermore, in preparation for transmitting in more than one sector during a time slot or in response to a trigger frame, the directional channel access logic circuitry of a STA (AP or non-AP) may perform directional CCAs for each sector in which the STA will transmit a communication. For instance, if a first STA will transmit a response to a second STA via a first sector and, during the same transmission opportunity (TxOP), transmit a communication to a third STA via a second sector, the first STA may perform a directional CCA via the first sector and the second sector prior to communicating in the TxOP.

For maintaining a quality of service (QoS), many embodiments define two or more access categories. Access categories may be associated with traffic to define priorities (in the form of parameter sets) for access to a channel for transmissions (or communications traffic) such as 60 GHz link transmissions. Many embodiments implement an enhanced distributed channel access (EDCA) protocol to establish the priorities. In some embodiments, the EDCA protocol includes access categories such as best efforts (AC_BE), background (AC_BK), video (AC_VI), and voice (AC_VO). Protocols for various standards provide default values for parameter sets for each of the access categories and the values may vary depending upon the type of a STA, the operational role of the STA, and/or the like. In some embodiments, STAs such as an AP MLD and a non-AP MLD may negotiate the values for the parameter sets of one or more or all the access categories during association, reassociation, and/or other frame exchanges.

In some embodiments, the EDCA parameter set may include one or more retry counts and a contention window per access category. A retry count may set a limit on the number of retries for transmission of a protocol data unit (PDU), generally referred to as a packet, and a retry counter may be incremented each time a STA attempts to transmit the same PDU. If the retry counter reaches the retry count limit before the PDU is transmitted, the transmission of the PDU may be designated as a failed transmission and the STA may remove the PDU from the front of a transmission queue. Thereafter the STA may begin an attempt to transmit the next PDU in the transmission queue or in other transmission queues. In some embodiments, the one or more retry counts may include a long retry count, a QoS retry count, a short retry count, and/or the like. For instance, default or negotiated EDCA parameter sets may include, e.g., four access categories and each access category may include at least one retry counter (variable retry count) and a contention window counter (variable contention window value). In other embodiments, a retry counter may be decremented from a retry count limit to zero or other lower retry count limit.

The contention window parameter(s) in a parameter set may include a minimum contention window value and a maximum contention window value. Each time a channel (link) is busy, the EDCA protocol may cause the STA receiving the busy CCA indication to generate a random number, referred to as a backoff count, between zero and the variable contention window value. The variable contention window value may be initially set to the minimum contention window and may be incremented each time an unsuccessful attempt to transmit the PDU causes the retry counter to increment (or decrement in other embodiments) causing the maximum potential backoff count to increase. In still other embodiments, a variable contention window value may be decremented and, in some of these embodiments, the maximum potential backoff count may increase as the variable contention window value is decremented (inverse relationship).

The directional channel access logic circuitry of a STA, such as a STA associated with a 60 GHz link, may establish resources such as memory and processing time to maintain, e.g., at least one variable retry count per transmission and at least one variable contention window value per access category. In such embodiments, when preparing to transmit a PDU from a transmission queue, the STA may be limited to performing a directional CCA for only one sector of the link since the STA may not, or cannot due to software and/or hardware limitations, maintain resources necessary to perform the EDCA protocol for more than one sector. For example, if the STA performs the directional CCA and the CCA reports that the 60 GHz link is busy, the STA may maintain the current variable values for the retry count and the variable contention window value until the PDU is successfully transmitted or the fails to transmit. The same resources must be maintained for each concurrent transmission or attempted transmission.

Some embodiments may comprise directional channel access logic circuitry to implement one or more retry counts and a contention window per access category per sector. "Per sector" refers to the number of sectors in which the STA may transmit during a TxOP. For instance, an area about antenna of the STA may be sectorized (divided into sectors) for the purposes of determining a direction of another STA from the STA and for beamforming some links such as the 60 GHz link between the STAs. If a STA will transmit communications such as PDUs via more than one sector during a TxOP, the directional channel access logic circuitry of the STA may maintain resources to support the number of sectors in which the STA may transmit PDUs during the same TxOP. In many embodiments, the number of sectors in which the STA may transmit PDUs during the same TxOP may be less that the total number of sectors about the antenna of the STA and may be fixed based on hardware and/or software limitations, fixed via a user preference or default preference, and/or fixed at one or more sectors based on a negotiated or established number during association with a Basic Service Set (BSS) or Extended Service Set (ESS) via another STA. In other embodiments, the number of sectors in which the STA may transmit PDUs during the same TxOP may be the total number of sectors about the antenna of the STA that the STA uses to distinguish the direction of an associated STA.

In addition to implementing one or more retry counts and a contention window per access category per sector, in some embodiments, directional channel access logic circuitry of the STA may maintain an additional one or more retry counts and a contention window for quasi-omni access. For instance, directional channel access logic circuitry of the STA may maintain the additional one or more variable retry counts for quasi-omni access and a variable contention window value per access category for quasi-omni access to allow the STA to operate in a quasi-omni mode if circumstances indicate that quasi-omni access is desirable. For instance, a non-AP STA may be able to communicate with an AP STA more often, or potentially obtain more TxOPs, if the STA operates in quasi-omni CCA mode rather than directional CCA mode.

Many embodiments comprise directional channel access logic circuitry to support directional CCA for multiple input, multiple output (MIMO) communications. For instance, directional channel access logic circuitry of a STA may maintain one or more variable retry counts and a variable contention window value per access category for quasi-omni access to allow the STA to use for MIMO communications in multiple sectors concurrently.

In further embodiments, directional channel access logic circuitry of the STA may maintain one or more variable retry counts per sector and a variable contention window value per access category per sector. In such embodiments, the STA may advantageously perform directional CCA in all sectors that are expected to be used in MIMO and only initiate MIMO transmission after all EDCA backoff counts per access category decrease to zero in all sectors that are expected to be used in MIMO. In other embodiments, a backoff counter may be incremented to the random or pseudorandom backoff count to implement that backoff count.

Note that during a TxOP, in some embodiments, the directional channel access logic circuitry may restrict a STA to transmissions only in sectors for which the STA performed a directional CCA for the TxOP. In some embodiments, the AP MLD may transmit a trigger frame to a non-AP MLD via a 60 GHz link and the AP MLD may include a carrier sense (CS) required bit in the trigger frame to indicate whether or not the non-AP MLD is required to perform a CCA such as a directional CCA in the sector of the AP MLD before responding to the trigger frame with a UL transmission. For instance, if the CS required field includes a bit value of a logical one, the non-AP MLD is required to perform at least a directional CCA such as an ED in the sector of the AP MLD to determine if the 60 GHz link is busy or idle. If the link is idle, the non-AP MLD may transmit. If the CS required field includes a bit value of a logical zero, the non-AP MLD is not required to perform a CCA to determine if the 60 GHz link is busy or idle. In other words, the non-AP MLD may transmit a response to the trigger frame to the AP MLD without performing a CCA. In other embodiments, the CS required field may include a logical zero to indicate that the non-AP MLD must perform a directional CCA or quasi-omni CCA before responding and a logical 1 to indicate the non-AP MLD may transmit in response to the trigger frame from the AP MLD without performing a CCA.

Note that while many embodiments refer to a 60 GHz link (which implies a 60 GHz carrier frequency as well as a frequency range, or bandwidth, of subcarriers or tones about the 60 GHz carrier frequency), other embodiments may implement near 60 GHz carriers such as carriers having a frequency between 55 GHz and 65 GHz or between 58 GHz and 62 GHz. Other embodiments, for example, may implement a 50 GHz carrier frequency or near 50 GHz frequency and still other embodiments may implement a 70 GHz frequency or a near 70 GHz frequency. Note also that these frequencies are interchangeable in discussions herein about a 60 GHz link and may be selected based on specific advantages of using such frequencies for hardware implementation and/or for meeting governmental requirements in various geographical areas for use of such frequencies. For instance, any discussion herein about a 60 GHz link is equally applicable to a 45 GHz link, 46 GHz link, 47 GHz link, 48 GHz link, 49 GHz link, 50 GHz link, 51 GHz link, 52 GHz link, 53 GHz link, etc., or any carrier frequency from 45 GHz through 75 GHz, or fractional frequency therein such as 65.2 GHz or 73.1 GHz.

Embodiments may also comprise directional channel access logic circuitry to facilitate communications by stations (STAs) in accordance with different versions of Institute of Electrical and Electronics Engineers (IEEE) 802.11 standards for wireless communications such as IEEE 802.11-220 December 2020; IEEE P802.11be™/D1.0, May 2021; IEEE P802.11ax™/D8.0, IEEE P802.11ay™/D7.0, IEEE P802.11az™/D3.0, IEEE P802.11ba™/D8.0, IEEE P802.11bb™/D0.4, IEEE P802.11bc™/D1.02, and IEEE P802.11bd™/D1.1.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

Various embodiments may be designed to address different technical problems associated with directional channel access in a link such as a 60 GHz link; performing directional CCAs only for sector(s) in which a STA will transmit during a TxOP; performing EDCA protocols for directional CCAs; maintaining backoff counts for directional and/or quasi-omni CCAs for directional transmissions between AP MLDs and non-AP MLDs; establishing a requirement to perform a directional CCA in response to a trigger frame; establishing a slotted TWT period and facilitating directional CCAs for both UL and downlink (DL) transmissions; and/or the like.

Different technical problems such as those discussed above may be addressed by one or more different embodiments. Embodiments may address one or more of these problems associated with directional channel access in a link such as a 60 GHz link. For instance, some embodiments that address problems associated with directional channel access may do so by one or more different technical means, such as, placing one or more protocol data units (PDUs) in a transmit queue for transmission, at least a first PDU of the one or more PDUs indicating an uplink (UL) transmission opportunity (TxOP) for a station (STA); performing a directional clear channel assessment (CCA) for a first sector of a 60 gigahertz (GHz) link, the directional CCA to determine only if the 60 GHz link in the first sector is busy or idle; determining the directional CCA indicates idle for the 60 GHz link in the first sector; causing transmission of the first PDU to the STA via the 60 GHz link in the first sector based on the directional CCA indication of idle; and receiving an acknowledgement (ACK) of receipt of the PDU from the STA; receiving a packet from a physical layer (PHY) indicating an uplink (UL) transmission opportunity (TxOP); placing a protocol data unit (PDU) in a transmit queue for transmission during the TxOP to an AP MLD on a 60 gigahertz (GHz) link via a first sector; performing a directional clear channel assessment (CCA) for the 60 GHz link in the first sector, the directional CCA to determine only if the 60 GHz link in the first sector is busy or idle; determining the directional CCA indicates idle for the 60 GHz link in the first sector; and causing transmission of the PDU to the AP MLD via the 60 GHz link in the first sector based on the directional CCA indication of idle; and/or the like.

Several embodiments comprise central servers, access points (APs), and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, and the like), and the like.

Some embodiments may facilitate wireless communications in accordance with multiple standards. Some embodiments may comprise low power wireless communications like Bluetooth®, cellular communications, and messaging systems. Furthermore, some wireless embodiments may incorporate a single antenna while other embodiments may employ multiple antennas or antenna elements.

While some of the specific embodiments described below will reference the embodiments with specific configurations, those of skill in the art will realize that embodiments of the present disclosure may advantageously be implemented with other configurations with similar issues or problems.

FIG. 1A depicts a system diagram illustrating an embodiment of a network environment for directional channel access logic circuitry, in accordance with one or more example embodiments. Wireless network 1000 may include one or more user devices 1020 and one or more access points(s) (AP) 1005, which may communicate in accordance with IEEE 802.11 communication standards. The user device(s) 1020 and 1040 may comprise mobile devices that are non-stationary (e.g., not having fixed locations) and/or stationary devices.

Figure 3:
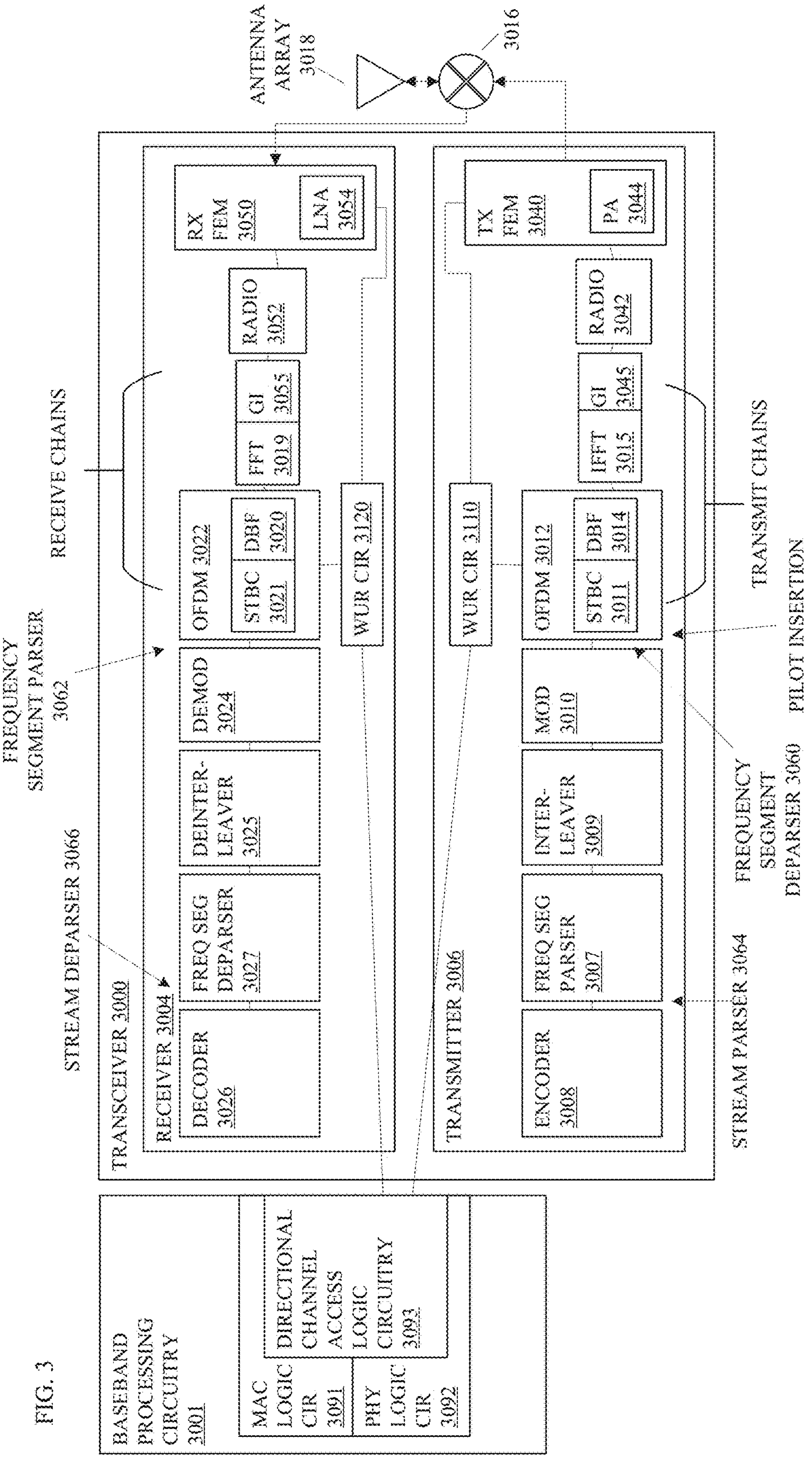
FIG. 3 depicts an embodiment of service period access with directional channel access logic circuitry.

In some embodiments, the user devices 1020 and 1040 and the AP 1005 may include one or more computer systems similar to that of the functional diagram of FIG. 3 and/or the example machine/system of FIGS. 5, 6, 7, and 8.

One or more illustrative user device(s) 1020 and 1040 and/or AP(s) 1005 may be operable by one or more user(s) 1010 and 1012. It should be noted that any addressable unit may be a station (STA). A STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 1020 and 1040 and the AP(s) 1005 may be STAs. The one or more illustrative user device(s) 1020 and 1040 and/or AP(s) 1005 may operate as an extended service set (ESS), a basic service set (BSS), a personal basic service set (PBSS), or a control point/access point (PCP/AP). The user device(s) 1020 (e.g., 1024, 1026, or 1028) and 1040 (1044, 1046, and 1048) and/or AP(s) 1005 may include any suitable processor-driven device including, but not limited to, a mobile device or a non-mobile, e.g., a static device. For example, user device(s) 1020 and 1040 and/or AP(s) 1005 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless network interface, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

In some embodiments, the user device(s) 1020 and 1040 and/or AP(s) 1005 may also include mesh stations in, for example, a mesh network, in accordance with one or more IEEE 802.11 standards and/or 3GPP standards.

Any of the user device(s) 1020 (e.g., user devices 1024, 1026, 1028), user device(s) 1040 (e.g., user devices 1044, 1046, 1048), and AP(s) 1005 may be configured to communicate with each other via one or more communications networks 1030 and/or 1035 wirelessly or wired. In some embodiments, the user device(s) 1020 and 1040 may also communicate peer-to-peer or directly with each other with or without the AP(s) 1005 and in some embodiments, the user device(s) 1020 and 1040 may also communicate peer-to-peer if enabled by the AP(s) 1005.

Any of the communications networks 1030, 1033, and/or 1035 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 1030, 1033, and/or 1035 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 1030, 1033, and/or 1035 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 1020 (e.g., user devices 1024, 1026, 1028), user device(s) 1040 (e.g., user devices 1044, 1046, 1048), and AP(s) 1005 may include one or more communications antennas. The one or more communications antennas may be any suitable type of antennas corresponding to the communications protocols used by the user device(s) 1020 (e.g., user devices 1024, 1026 and 1028), user device(s) 1040 (e.g., user devices 1044, 1046, 1048), and AP(s) 1005. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 1020 1040, and/or AP(s) 1005.

Any of the user device(s) 1020 (e.g., user devices 1024, 1026, 1028), user device(s) 1040 (e.g., user devices 1044, 1046, 1048), and AP(s) 1005 may be configured to perform directional transmission and/or directional reception in conjunction with wirelessly communicating in a wireless network. Any of the user device(s) 1020 (e.g., user devices 1024, 1026, 1028), user device(s) 1040 (e.g., user devices 1044, 1046, 1048), and AP(s) 1005 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 1020 (e.g., user devices 1024, 1026, 1028), user device(s) 1040 (e.g., user devices 1044, 1046, 1048), and AP(s) 1005 may be configured to perform any given directional transmission towards one or more defined transmit sectors such as sectors A and B. Any of the user device(s) 1020 (e.g., user devices 1024, 1026, 1028), user device(s) 1040 (e.g., user devices 1044, 1046, 1048), and AP(s) 1005 may be configured to perform any given directional reception from one or more defined receive sectors such as sectors A and B.

MIMO beamforming in a wireless network may be accomplished using RF beamforming and/or digital beamforming. In some embodiments, in performing a given MIMO transmission, user devices 1020, 1040, and/or AP(s) 1005 may be configured to use all or a subset of its one or more communications antennas to perform MIMO beamforming.

Any of the user devices 1020 (e.g., user devices 1024, 1026, 1028), user device(s) 1040 (e.g., user devices 1044, 1046, 1048), and AP(s) 1005 may include any suitable radio and/or transceiver for transmitting and/or receiving radio frequency (RF) signals in the bandwidth and/or channels corresponding to the communications protocols utilized by any of the user device(s) 1020 and AP(s) 1005 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax, 802.11be), 5 GHz channels (e.g. 802.11n, 802.11ac, 802.11ax, 802.11be), 6 GHz (e.g., 802.11be), or 60 GHz channels (e.g. 802.11ad, 802.11ay, Next Generation Wi-Fi) or 800 MHz channels (e.g. 802.11ah). The communications antennas may operate at 28 GHz, 40 GHz, or any carrier frequency between 45 GHz and 75 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a power amplifier (PA), a low noise amplifier (LNA), additional signal amplifiers, an analog-to-digital (A/D) converter, one or more buffers, and a digital baseband.

In one embodiment, and with reference to FIG. 1A, AP(s) 1005 may transmit physical layer protocol data unit (PPDUs) 1022 and 1042 with one of the user devices 1020 in sector A and one of the user devices 1040 in sector B. In some embodiments, the AP(s) 1005 may transmit the PPDU 1022 independently of the transmission of the PPDU 1042 and, in some of these embodiments, the AP(s) 1005 may transmit the PPDU 1022 concurrently with the transmission of the PPDU 1042. For instance, the AP(s) 1005 may be capable of transmitting in multiple sectors simultaneously and/or independently. The AP(s) 1005 may perform a quasi-omni CCA to determine that the there are no interfering transmissions in a 60 GHz link in any sector about the AP(s) 1005 and concurrently transmit the PPDUs 1022 and 1042 in sectors A and B respectively. The PPDUs 1022 and 1042 may comprise trigger frames to uplink (UL) communications from the user devices 1024 and 1044. In some embodiments, the AP(s) 1005 may include a bit to indicate that the user devices 1024 and 1044 do not have to perform CCA in response to the trigger frames but can just respond with the UL transmission. In other embodiments, the AP(s) 1005 may include a bit to indicate that the user devices 1024 and 1044 that the user devices 1024 and 1044 do have to perform CCA in response to the trigger frames but can just respond with the UL transmission.

In response to the trigger frames, the user devices 1024 and 1044 may perform directional CCAs in sectors towards the AP(s) 1005. For instance, the user device 1024 may maintain, in memory, one retry counter and one contention window value per access category for transmissions. If the directional CCA in the sector that is the direction of the AP(s) 1005 returns a value of busy, the directional access logic circuitry of the user device 1022 may increment the retry count by, e.g., 1, and, for the access category associated with the PPDU 1022, increment the contention window value by a predefined increment between a minimum contention window value and a maximum contention window value associated with the access category.

The user device 1022 may also determine a backoff count such as a random number or pseudo-random number between 0 and the CW value for each access category and maintain the backoff counts per access category in memory. The directional access logic circuitry of the user device 1022 may then decrement the backoff counts based on clock cycles after the directional CCA shows the wireless medium as idle and continue to decrement the backoff counts until the backoff count of the PPDU 1022 reaches 0, or until the directional CCA shows the wireless medium as busy, which would cause the backoff procedure to start over. Once the backoff count reaches 0 (zero), the user device 1024 may transmit the UL transmission to the AP(s) 1005.

Concurrently, the user device 1044 may perform a directional CCA on a 60 GHz link in the sector of the AP(s) 1005 that returns an indication that the 60 GHz link is idle. In response to the determination that the 60 GHz link is idle in that sector, the user device 1044 may transmit the UL transmission.

Alternatively, if each of the trigger frames from the AP(s) 1005 include a bit such as a carrier sense (CS) required bit in a CS Required field of a common info field of a MAC trigger frame that indicates that CCA is not required, the user devices 1024 and 1044 may both respond concurrently with UL transmissions to the AP(s) 1005 without performing a directional CCA or a quasi-omni CCA.

In another example, AP(s) 1005 may schedule, in a beacon frame, a target wake time (TWT) service period (SP) with a TWT start time and assign time slots to, e.g., user devices 1024 and 1044 for a first time slot and user devices 1026 and 1046 for a second time slot. The user devices 1024, 1026, 1044, and 1046 may wake for the TWT SP. At the first time slot, the user devices 1024 and 1044 may both perform directional CCAs for 60 GHz links in the sector of the direction of the AP(s) 1005 and, if the directional CCAs indicate that the wireless medium is idle, the user devices 1024 and 1044 may transmit UL transmissions to the AP(s) 1005. The AP(s) 1005 may perform a directional CCA for the user device 1024 and a directional CCA for the user device 1044 to determine if the wireless medium of the 60 GHz link is busy or idle. If the wireless medium is not busy for the user device 1024, the AP(s) 1005 may transmit a downlink (DL) transmission to the user device 1024 such as an acknowledgement (ACK) frame.

If the 60 GHz link is busy for the user device 1044, the AP(s) 1005 may perform a backoff procedure with a random or pseudo-random backoff count as discussed above. Once the 60 GHz link wireless medium is idle for the backoff count, the AP(s) 1005 may transmit the DL transmission to the user device 1044 during the same transmission opportunity (TxOP) as the UL transmission.

Figure 1B:
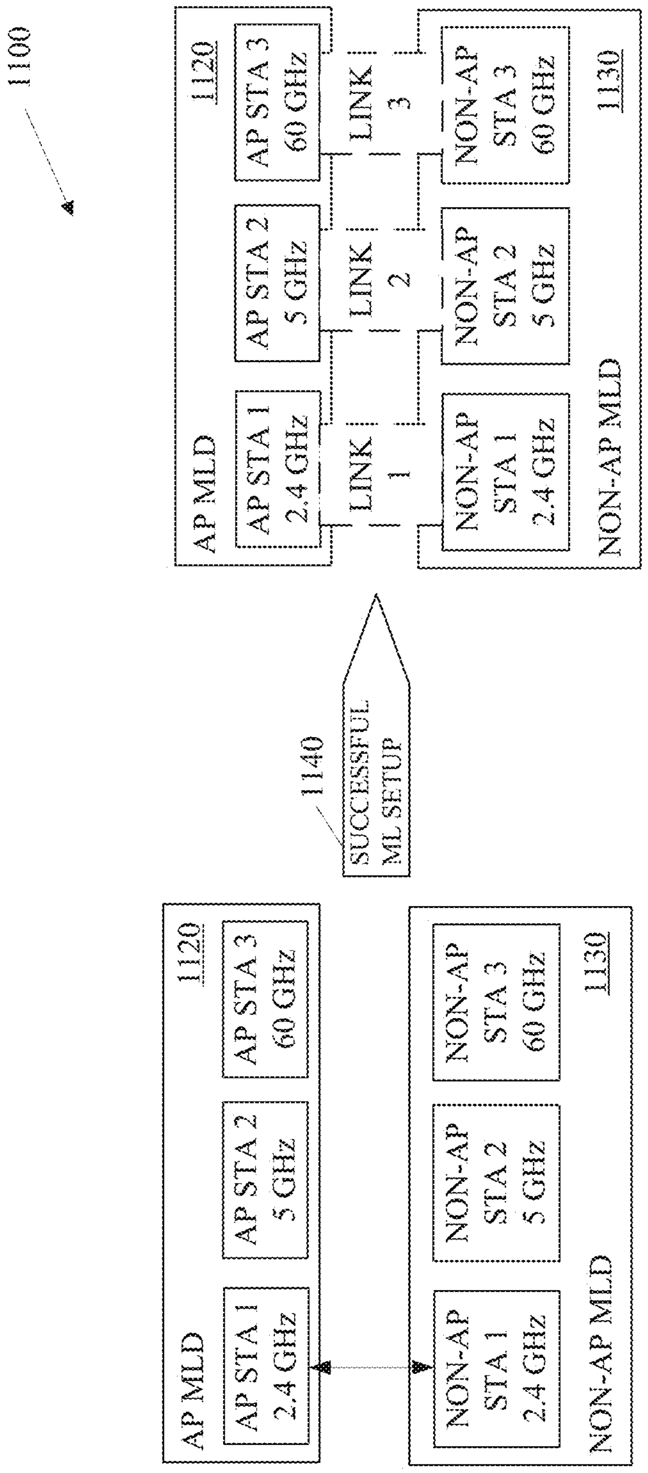
FIG. 1B depicts an embodiment illustrating interactions between stations (STAs) to establish multiple links between an access point (AP) multi-link device (MLD) and a non-AP MLD.

FIG. 1B depicts an embodiment 1100 illustrating interactions between stations (STAs) to establish multiple links between an access point (AP) multi-link device (MLD) 1120 and a non-AP MLD 1130. The AP MLD 1120 has three affiliated AP STAs: AP STA 1 operates on 2.4 GHz band, AP STA 2 operates on 5 GHz band, and AP STA 3 operates on 60 GHz band. The non-AP STA 1 affiliated with the non-AP MLD 1130 sends an association request frame (or a reassociation request frame) to AP STA 1 affiliated with the AP MLD 1120. The association request frame may have a TA field set to the MAC address of the non-AP STA 1 and an RA field set to the MAC address of the AP STA 1. The association request frame may include complete information of non-AP STA 1, non-AP STA 2, and non-AP STA 3 to request three links to be setup (one link between AP STA 1 and non-AP STA 1, one link between AP STA 2 and non-AP STA 2, and one link between AP STA 3 and non-AP STA 3) and an ML element that indicates the MLD MAC address of the non-AP MLD 1130.

AP STA 1, affiliated with the AP MLD 1120, may send an association response frame to non-AP STA 1 affiliated with the non-AP MLD 1130 with a TA field of the association response frame is set to the MAC address of the AP STA 1 and an RA field of the association response frame set to the MAC address of the non-AP STA 1, to indicate successful multi-link setup 1140. The association response frame may include complete information of AP STA 1, AP STA 2, and AP STA 3 and an ML element that indicates the MLD MAC address of the AP MLD 1120. After successful ML setup between the non-AP MLD 1130 and the AP MLD 1120, three links are setup (LINK 1 between AP 1 and non-AP STA 1, LINK 2 between AP 2 and non-AP STA 2, and LINK 3 between AP STA 3 and non-AP STA 3).

In some embodiments, the non-AP MLD 1130 may associate with less than all the links available from the AP MLD 1120 for various reasons. For instance, in some embodiments, the non-AP MLD 1130 may only be capable of establishing two of the links. In some embodiments, the non-AP MLD 1130 may establish a link with a second AP MLD because the second AP MLD may have a better signal-to-noise ratio associated with one or more links and be associated with the same ESS. In some embodiments, the non-AP MLD 1130 may establish a link with a second AP MLD because the second AP MLD may be associated with a different ESS or a BSS that is not associated with the BSS of the AP MLD 1120.

Figure 1C:
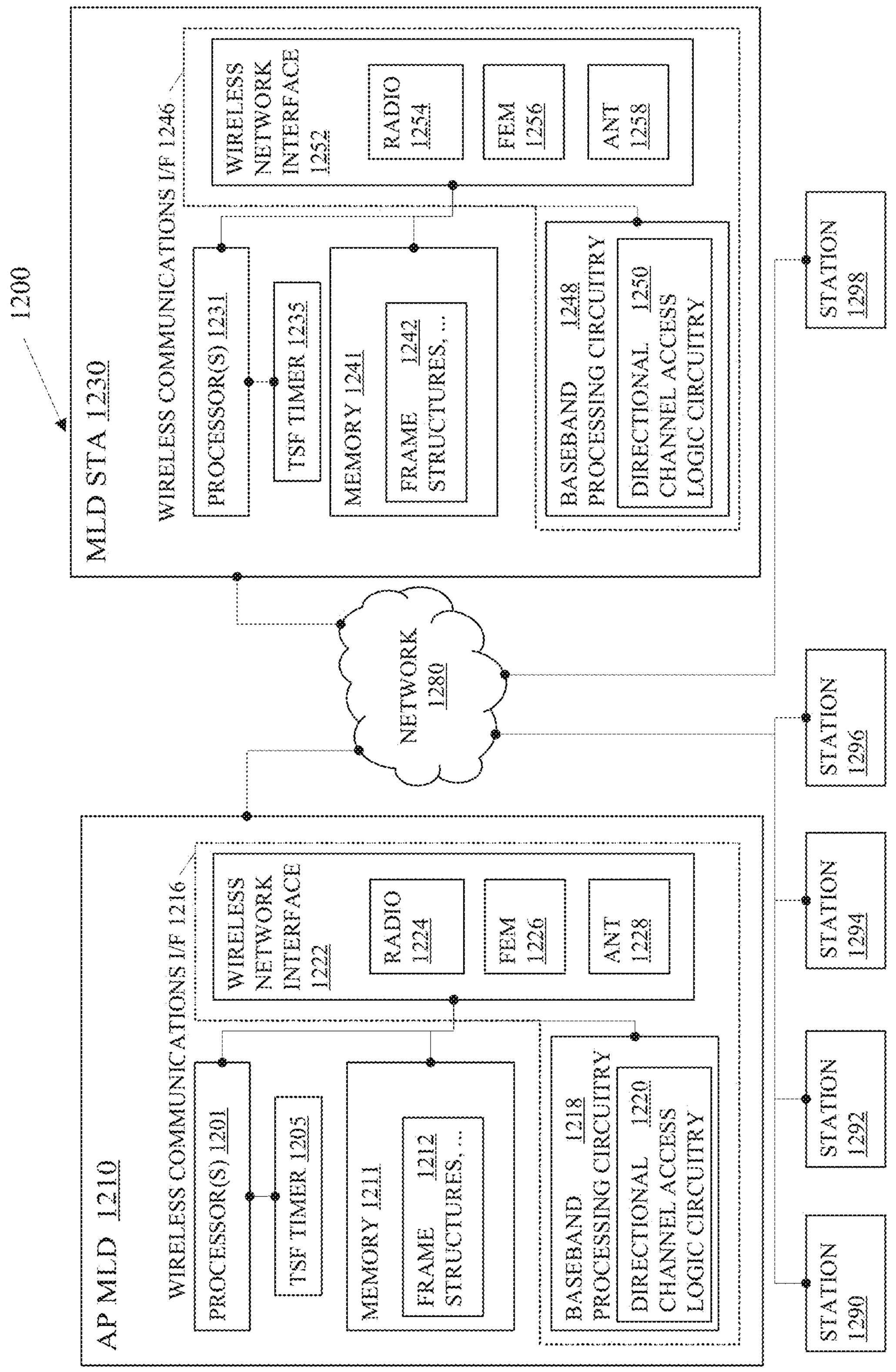
FIG. 1C depicts an embodiment of a system including multiple STAs to implement directional channel access logic circuitry, in accordance with one or more example embodiments.

FIG. 1C depicts an embodiment of a system 1200 including multiple MLD STAs to implement directional channel access logic circuitry, in accordance with one or more example embodiments. System 1200 may transmit or receive as well as generate, decode, and interpret transmissions between an AP MLD 1210 and multiple MLD STAs 1230, 1290, 1292, 1294, 1296, and 1298, associated with the AP MLD 1210. The AP MLD 1210 may be wired and wirelessly connected to each of the MLD STAs 1230, 1290, 1292, 1294, 1296, and 1298.

In some embodiments, the AP MLD 1210 and MLD STA 1230 may include one or more computer systems similar to that of the example machines/systems of FIGS. 5, 6, 7, and 8.

Each MLD STA 1230, 1290, 1292, 1294, 1296, and 1298 may associate with the AP MLD 1210 via at least one link such as a 60 GHz link. After associating with the AP MLD 1210, the AP MLD 1210 may buffer data to downlink (DL) to the MLD STAs 1230, 1290, 1292, 1294, 1296, and 1298 and each MLD STA 1230, 1290, 1292, 1294, 1296, and 1298 may collect data to uplink (UL) to the AP MLD 1210.

Periodically, the directional channel access logic circuitry 1220 of AP MLD 1210 may perform a quasi-omni CCA and, if the 60 GHz link is idle, broadcast a beacon frame, short beacon frame, or other management frame addressed to the MLD STAs 1230, 1290, 1292, 1294, 1296, and 1298 with individual MLD STA addresses as target addresses (TAs) or with one or more group addresses as TAs. The beacon frame (short beacon frame or other management frame) may identify a TWT SP and may also include indications of STA assignments to time slots within the TWT SP. The STA assignments may inform each of the MLD STAs 1230, 1290, 1292, 1294, 1296, and 1298 a specific time slot for a TxOP for the AP MLD 1210 to DL buffered data to the MLD STAs 1230, 1290, 1292, 1294, 1296, and 1298.

In response to receipt of the beacon frame (short beacon frame or other management frame) from the AP MLD 1210, one or more of MLD STAs 1230, 1290, 1292, 1294, 1296, and 1298 may wake during the TWT SP to receive the DL buffered data during their respective TxOPs. For each of the MLD STAs 1230, 1290, 1292, 1294, 1296, and 1298, the directional channel access logic circuitry 1220 of the AP MLD 1210 may perform a directional CCA at the beginning of the TxOP to determine if the 60 GHz link is idle or busy and, if idle, DL buffered data to the MLD STA assigned to the TxOP. Furthermore, upon receipt of the DLs, the directional channel access logic circuitry of one or more of MLD STAs 1230, 1290, 1292, 1294, 1296, and 1298 may perform a directional CCA after receipt of the DL to determine if the 60 GHz link is idle and, if the 60 GHz link is idle, UL an ACK to the AP MLD 1210 to acknowledge receipt of the DL.

If directional CCA of the AP MLD 1210 or one of the MLD STAs 1230, 1290, 1292, 1294, 1296, and 1298 reports a busy 60 GHz link, the directional channel access logic circuitry 1220 of the AP MLD 1210 or the directional channel access logic circuitry of the one of the MLD STAs 1230, 1290, 1292, 1294, 1296, and 1298 may perform a backoff procedure. The backoff procedure may involve waiting until the 60 GHz link is idle, generating a backoff count such as a random number between zero and a variable contention window value, and then decrementing the backoff count while the 60 GHz link remains idle. If the backoff count is decremented to zero while the 60 GHz link remains idle, the AP MLD 1210 or the one of the MLD STAs 1230, 1290, 1292, 1294, 1296, and 1298 may transmit the PDU such as the DL or the UL. On the other hand, if the directional CCA determines that the 60 GHz link is busy before decrementing the backoff count to zero, a retry counter is incremented and a variable contention window value for each access category is incremented. Each time a transmission attempt for the PDU fails, the retry counter is incremented and, each time the retry counter is incremented, the variable contention window value is incremented. The retry counter may be incremented to a retry limit. If the retry counter reaches the retry limit, the attempted transmission of the PDU fails.

The variable contention window value is initiated with a minimum contention window value associated with the corresponding access category at the first attempt to transmit a PDU and is incremented by predefined increments until the variable contention window value reaches a maximum contention window value for each access category. The variable contention window value may remain at the maximum contention window value until the PDU is transmitted or the transmission of the PDU fails, wherein the variable contention window value is reset to the minimum contention window value.

Note that if the AP MLD 1210 only uses quasi-omni CCA, the AP MLD 1210 may maintain with processing cycles in memory, at least one retry count, one variable contention window per access category, and one backoff count per access category. If the AP MLD 1210 only uses directional CCA for, e.g., trigger-based communications with MLD STAs, the AP MLD 1210 may maintain with processing cycles in memory, at least one retry count per sector, one variable contention window per access category per sector, and one backoff count per access category per sector. In this case, the "per sector" refers to the number of sectors in which the AP MLD 1210 is designed to transmit in concurrently. For instance, if the AP MLD 1210 is only designed to concurrently transmit in two sectors such as sectors A and B in FIG. 1A, the AP MLD 1210 may maintain with processing cycles in memory, at least one retry count for each of the two sectors, one variable contention window per access category for each of the two sectors, and one backoff count per access category for each of the two sectors. However, there is no maximum number of sectors for the AP MLD 1210 so the AP MLD 1210 may have, e.g., 8 sectors or 16 sectors in which the AP MLD 1210 may transmit concurrently.

In some embodiments, the AP MLD 1210 may maintain with processing cycles in memory, at least one retry count per sector, one variable contention window per access category per sector, one backoff count per access category per sector as well as at least one retry count for quasi-omni CCA, one variable contention window per access category for quasi-omni CCA, and one backoff count per access category for quasi-omni CCA. Maintaining the resources for quasi-omni CCA in addition to directional CCAs per sector advantageously offers the AP MLD 1210 to use whichever CCA is most advantageous for a transmission.

Note that if the MLD STA 1230 (as well as the other MLD STAs) only uses directional CCA such as when the MLD STA 1230, the AP MLD 1210 may only communicate with the AP MLD 1210 via the 60 GHz link in response to a trigger frame or during a TWT SP (or similar situation in which the AP MLD 1210 and the MLD STA 1230 have a TxOP assigned to communications only between each other), the MLD STA 1230 may maintain with processing cycles in memory, at least one retry count for the one sector in the direction of the AP MLD 1210, one variable contention window per access category for the one sector in the direction of the AP MLD 1210, and one backoff count per access category for the one sector in the direction of the AP MLD 1210. In some embodiments, the MLD STA 1230 may maintain with processing cycles in memory, at least one retry count for the one sector in the direction of the AP MLD 1210, one variable contention window per access category for the one sector in the direction of the AP MLD 1210, one backoff count per access category for the one sector in the direction of the AP MLD 1210 as well as at least one retry count for quasi-omni CCA, one variable contention window per access category for quasi-omni CCA, and one backoff count per access category for quasi-omni CCA. Maintaining the resources for quasi-omni CCA in addition to directional CCA advantageously offers the MLD STA 1230 to use whichever CCA is most advantageous for a transmission.

The AP MLD 1210 and MLD STA 1230 may comprise processor(s) 1201 and memory 1231, respectively. The processor(s) 1201 may comprise any data processing device such as a microprocessor, a microcontroller, a state machine, and/or the like, and may execute instructions or code in the memory 1211. The memory 1211 may comprise a storage medium such as Dynamic Random Access Memory (DRAM), read only memory (ROM), buffers, registers, cache, flash memory, hard disk drives, solid-state drives, or the like. The memory 1211 may store 1212 the frames, frame structures, frame headers, etc., and may also comprise code to generate, scramble, encode, decode, parse, and interpret MAC frames and/or PHY frames and PPDUs.

The baseband processing circuitry 1218 may comprise a baseband processor and/or one or more circuits to implement a station management entity. In some embodiments, the station management entity may interact with a MAC layer management entity to perform MAC layer functionality and a PHY management entity to perform PHY functionality. In such embodiments, the baseband processing circuitry 1218 may interact with processor(s) 1201 to coordinate higher layer functionality with MAC layer and PHY functionality.

In some embodiments, the baseband processing circuitry 1218 may interact with one or more analog devices to perform PHY functionality such as scrambling, encoding, modulating, and the like. In other embodiments, the baseband processing circuitry 1218 may execute code to perform one or more of the PHY functionality such as scrambling, encoding, modulating, and the like.

The MAC layer functionality may execute MAC layer code stored in the memory 1211. In further embodiments, the MAC layer functionality may interface the processor(s) 1201.

The MAC layer functionality may communicate with the PHY to transmit a MAC frame such as a multiple-user (MU) ready to send (RTS), referred to as a MU-RTS, in a PHY frame such as an extremely high throughput (EHT) MU PPDU to the MLD STA 1230. The MAC layer functionality may generate frames such as management, data, and control frames.

The PHY may prepare the MAC frame for transmission by, e.g., determining a preamble to prepend to a MAC frame to create a PHY frame. The preamble may include one or more short training field (STF) values, long training field (LTF) values, and signal (SIG) field values. A wireless network interface 1222 or the baseband processing circuitry 1218 may prepare the PHY frame as a scrambled, encoded, modulated PPDU in the time domain signals for the radio 1224. Furthermore, the TSF timer 1205 may provide a timestamp value to indicate the time at which the PPDU is transmitted.

After processing the PHY frame, a radio 1225 may impress digital data onto subcarriers of RF frequencies for transmission by electromagnetic radiation via elements of an antenna array or antennas 1228 and via the network 1280 to a receiving MLD STA such as the MLD STA 1230.

The wireless network I/F 1222 also comprises a receiver. The receiver receives electromagnetic energy, extracts the digital data, and the analog PHY and/or the baseband processor 1218 decodes a PHY frame and a MAC frame from a PPDU.

The MLD STA 1230 may receive the MU-RTS in the EHT MU PPDU from the AP MLD 1210 via the network 1280. The MLD STA 1230 may comprise processor(s) 1231 and memory 1241. The processor(s) 1231 may comprise any data processing device such as a microprocessor, a microcontroller, a state machine, and/or the like, and may execute instructions or code in the memory 1241. The memory 1241 may comprise a storage medium such as Dynamic Random Access Memory (DRAM), read only memory (ROM), buffers, registers, cache, flash memory, hard disk drives, solid-state drives, or the like. The memory 1241 may store 1242 the frames, frame structures, frame headers, etc., and may also comprise code to generate, scramble, encode, decode, parse, and interpret MAC frames and/or PHY frames (PPDUs).

The baseband processing circuitry 1248 may comprise a baseband processor and/or one or more circuits to implement a station management entity and the station management entity may interact with a MAC layer management entity to perform MAC layer functionality and a PHY management entity to perform PHY functionality. In such embodiments, the baseband processing circuitry 1248 may interact with processor(s) 1231 to coordinate higher layer functionality with MAC layer and PHY functionality.

In some embodiments, the baseband processing circuitry 1248 may interact with one or more analog devices to perform PHY functionality such as descrambling, decoding, demodulating, and the like. In other embodiments, the baseband processing circuitry 1218 may execute code to perform one or more of the PHY functionalities such as descrambling, decoding, demodulating, and the like.

The MLD STA 1230 may receive the EHT MU PPDU at the antennas 1258, which pass the signals along to the FEM 1256. The FEM 1256 may amplify and filter the signals and pass the signals to the radio 1254. The radio 1254 may filter the carrier signals from the signals and determine if the signals represent a PPDU. If so, analog circuitry of the wireless network I/F 1252 or physical layer functionality implemented in the baseband processing circuitry 1248 may demodulate, decode, descramble, etc. the PPDU. The baseband processing circuitry 1248 may identify, parse, and interpret the MAC MU-RTS from the physical layer service data unit (PSDU) of the EHT MU PPDU.

Figure 1D:
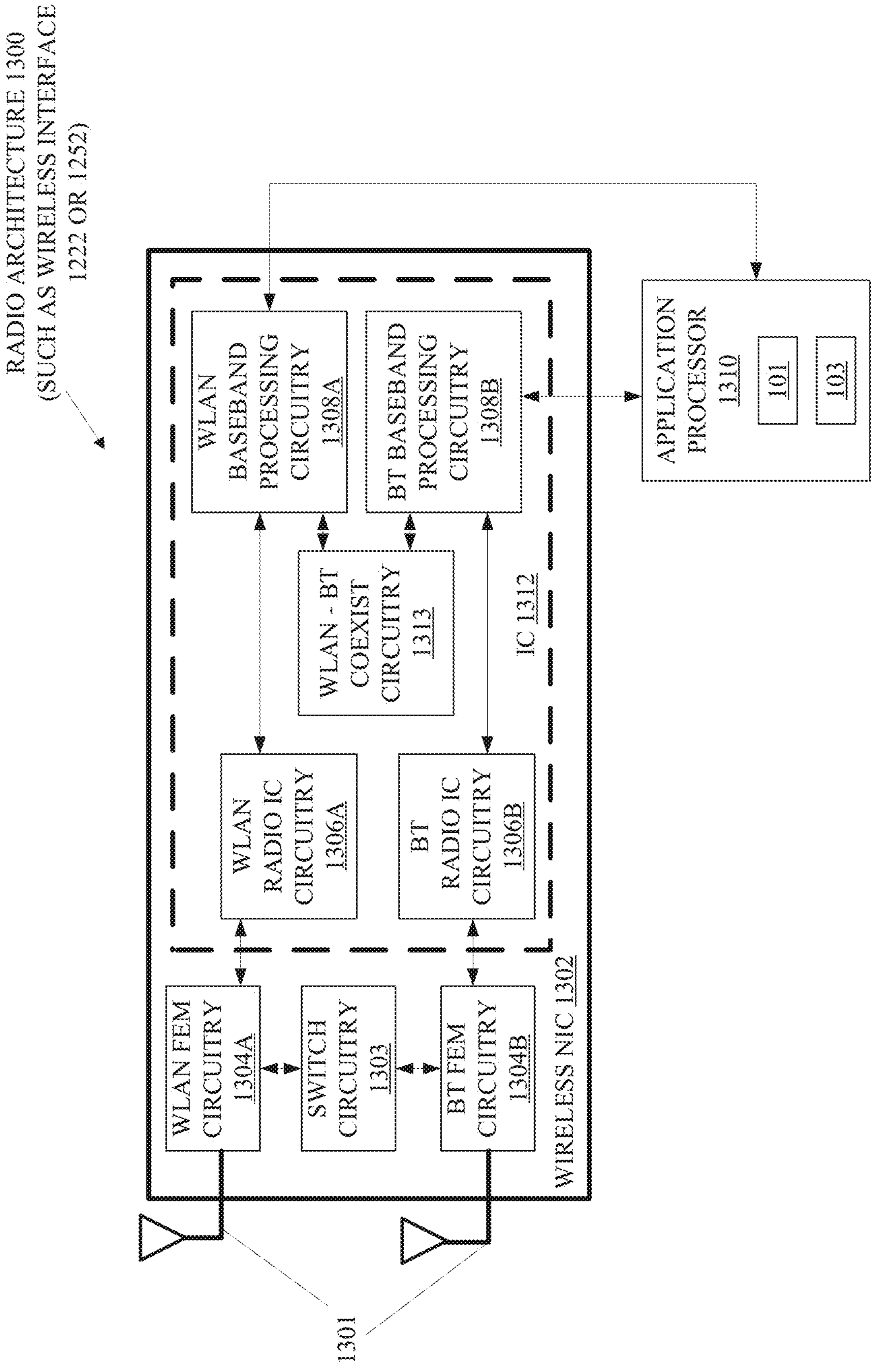
FIG. 1D illustrates an embodiment of a radio architecture for STAs, such as the wireless interfaces for STAs depicted in FIGS. 1A-C, to implement directional channel access logic circuitry.

FIG. 1D is a block diagram of a radio architecture 1300 such as the wireless communications I/F 1222 and 1252 in accordance with some embodiments that may be implemented in, e.g., the AP MLD 1210 and/or the MLD STA 1230 of FIG. 1C. The radio architecture 1300 may include radio front-end module (FEM) circuitry 1304*a-b*, radio IC circuitry 1306*a-b* and baseband processing circuitry 1308*a-b*. The radio architecture 1300 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1304*a-b* may include a WLAN or Wi-Fi FEM circuitry 1304*a* and a Bluetooth (BT) FEM circuitry 1304*b*. The WLAN FEM circuitry 1304*a* may include a receive signal path comprising circuitry configured to operate on WLAN RF signals received from one or more antennas 1301, to amplify the received signals and to provide the amplified versions of the received signals to the WLAN radio IC circuitry 1306*a* for further processing. The BT FEM circuitry 1304*b* may include a receive signal path which may include circuitry configured to operate on BT RF signals received from one or more antennas 1301, to amplify the received signals and to provide the amplified versions of the received signals to the BT radio IC circuitry 1306*b* for further processing. FEM circuitry 1304*a* may also include a transmit signal path which may include circuitry configured to amplify WLAN signals provided by the radio IC circuitry 1306*a* for wireless transmission by one or more of the antennas 1301. In addition, FEM circuitry 1304*b* may also include a transmit signal path which may include circuitry configured to amplify BT signals provided by the radio IC circuitry 1306*b* for wireless transmission by the one or more antennas. In the embodiment of FIG. 1D, although FEM 1304*a* and FEM 1304*b* are shown as being distinct from one another, embodiments are not so limited, and include within their scope the use of an FEM (not shown) that includes a transmit signal path and/or a receive signal path for both WLAN and BT signals, or the use of one or more FEM circuitries where at least some of the FEM circuitries share transmit and/or receive signal paths for both WLAN and BT signals.

Radio IC circuitry 1306*a-b* as shown may include WLAN radio IC circuitry 1306*a* and BT radio IC circuitry 1306*b*. The WLAN radio IC circuitry 1306*a* may include a receive signal path which may include circuitry to down-convert WLAN RF signals received from the FEM circuitry 1304*a* and provide baseband signals to WLAN baseband processing circuitry 1308*a*. BT radio IC circuitry 1306*b* may in turn include a receive signal path which may include circuitry to down-convert BT RF signals received from the FEM circuitry 1304*b* and provide baseband signals to BT baseband processing circuitry 1308*b*. WLAN radio IC circuitry 1306*a* may also include a transmit signal path which may include circuitry to up-convert WLAN baseband signals provided by the WLAN baseband processing circuitry 1308*a* and provide WLAN RF output signals to the FEM circuitry 1304*a* for subsequent wireless transmission by the one or more antennas 1301. BT radio IC circuitry 1306*b* may also include a transmit signal path which may include circuitry to up-convert BT baseband signals provided by the BT baseband processing circuitry 1308*b* and provide BT RF output signals to the FEM circuitry 1304*b* for subsequent wireless transmission by the one or more antennas 1301. In the embodiment of FIG. 1D, although radio IC circuitries 1306*a* and 1306*b* are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1308*a-b* may include a WLAN baseband processing circuitry 1308*a* and a BT baseband processing circuitry 1308*b*. The WLAN baseband processing circuitry 1308*a* may include a memory, such as, for example, a set of RAM arrays in a Fast Fourier Transform or Inverse Fast Fourier Transform block (not shown) of the WLAN baseband processing circuitry 1308*a*. Each of the WLAN baseband processing circuitry 1308*a* and the BT baseband processing circuitry 1308*b* may further include one or more processors and control logic to process the signals received from the corresponding WLAN or BT receive signal path of the radio IC circuitry 1306*a-b*, and to also generate corresponding WLAN or BT baseband signals for the transmit signal path of the radio IC circuitry 1306*a-b*. Each of the baseband processing circuitries 1308*a* and

1308*b* may further include physical layer (PHY) and medium access control layer (MAC) circuitry, and may further interface with a device for generation and processing of the baseband signals and for controlling operations of the radio IC circuitry 1306*a-b*.

Referring still to FIG. 1D, according to the shown embodiment, WLAN-BT coexistence circuitry 1313 may include logic providing an interface between the WLAN baseband circuitry 1308*a* and the BT baseband circuitry 1308*b* to enable use cases requiring WLAN and BT coexistence. In addition, a switch circuitry 1303 may be provided between the WLAN FEM circuitry 1304*a* and the BT FEM circuitry 1304*b* to allow switching between the WLAN and BT radios according to application needs. In addition, although the antennas 1301 are depicted as being respectively connected to the WLAN FEM circuitry 1304*a* and the BT FEM circuitry 1304*b*, embodiments include within their scope the sharing of one or more antennas as between the WLAN and BT FEMs, or the provision of more than one antenna connected to each of FEM 1304*a* or 1304*b*.

In some embodiments, the front-end module circuitry 1304*a-b*, the radio IC circuitry 1306*a-b*, and baseband processing circuitry 1308*a-b* may be provided on a single radio card, such as wireless network interface card (NIC) 1302. In some other embodiments, the one or more antennas 1301, the FEM circuitry 1304*a-b* and the radio IC circuitry 1306*a-b* may be provided on a single radio card. In some other embodiments, the radio IC circuitry 1306*a-b* and the baseband processing circuitry 1308*a-b* may be provided on a single chip or integrated circuit (IC), such as IC 1312.

In some embodiments, the wireless NIC 1302 may include a WLAN radio card and may be configured for Wi-Fi communications, although the scope of the embodiments is not limited in this respect. In some of these embodiments, the radio architecture 1300 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 1300 may be part of a Wi-Fi communication station (STA) such as a wireless access point (AP), a base station or a mobile device including a Wi-Fi device. In some of these embodiments, radio architecture 1300 may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2020, 802.11ay, 802.11ba, 802.11ax, and/or 802.11be standards and/or proposed specifications for WLANs, although the scope of embodiments is not limited in this respect. The radio architecture 1300 may also be suitable to transmit and/or receive communications in accordance with other techniques and standards.

In some embodiments, the radio architecture 1300 may be configured for high-efficiency Wi-Fi (HEW) communications in accordance with the IEEE 802.11ax standard. In these embodiments, the radio architecture 1300 may be configured to communicate in accordance with an OFDMA technique, although the scope of the embodiments is not limited in this respect.

In some other embodiments, the radio architecture 1300 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1D, the BT baseband processing circuitry 1308*b* may be compliant with a Bluetooth (BT) connectivity specification such as Bluetooth 5.0, or any other iteration of the Bluetooth specification.

In some embodiments, the radio architecture 1300 may include other radio cards, such as a cellular radio card configured for cellular (e.g., 5GPP such as LTE, LTE-Advanced or 7G communications).

In some IEEE 802.11 embodiments, the radio architecture 1300 may be configured for communication over various channel bandwidths including bandwidths having center frequencies of about 2.4 GHZ, 5 GHZ, and 6 GHz. The various bandwidths may include bandwidths of about 20 MHz, 40 MHz, 80 MHz, 160 MHz, 240 MHz, and 320 MHz with contiguous or non-contiguous bandwidths having increments of 20 MHz, 40 MHZ, 80 MHZ, 160 MHz, 240 MHz, and 320 MHz. The scope of the embodiments is not limited with respect to the above center frequencies, however.

Figure 1E:
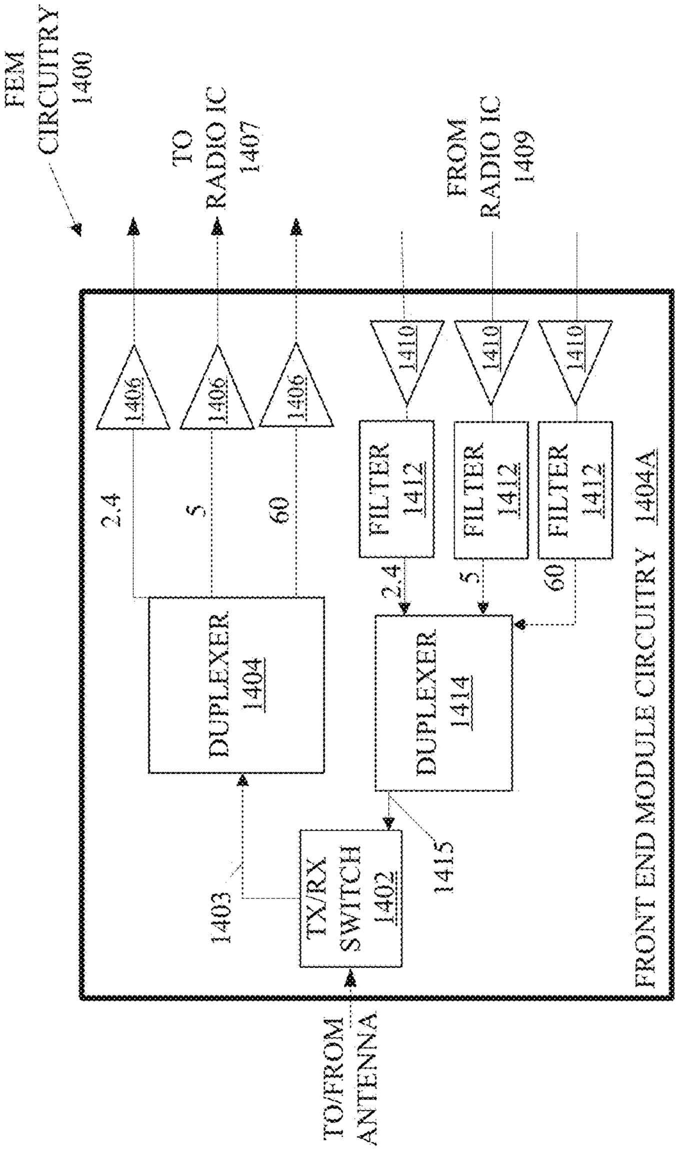
FIG. 1E illustrates an embodiment of front end module (FEM) circuitry of a wireless interface for STAs, such as the STAs in FIGS. 1A-C, to implement directional channel access logic circuitry.

FIG. 1E illustrates FEM circuitry 1400 such as WLAN FEM circuitry 1304*a* shown in FIG. 1D in accordance with some embodiments. Although the example of FIG. 1E is described in conjunction with the WLAN FEM circuitry 1304*a*, the example of FIG. 1E may be described in conjunction with other configurations such as the BT FEM circuitry 1304*b*.

In some embodiments, the FEM circuitry 1400 may include a TX/RX switch 1402 to switch between transmit mode and receive mode operation. The FEM circuitry 1400 may include a receive signal path and a transmit signal path. The receive signal path of the FEM circuitry 1400 may include a low-noise amplifier (LNA) 1406 to amplify received RF signals 1403 and provide the amplified received RF signals 1407 as an output (e.g., to the radio IC circuitry 1306*a-b* (FIG. 1D)). The transmit signal path of the circuitry 1304*a* may include a power amplifier (PA) to amplify input RF signals 1409 (e.g., provided by the radio IC circuitry 1306*a-b*), and one or more filters 1412, such as band-pass filters (BPFs), low-pass filters (LPFs) or other types of filters, to generate RF signals 1415 for subsequent transmission (e.g., by one or more of the antennas 1301 (FIG. 1D)) via an example duplexer 1414.

In some dual-mode embodiments for Wi-Fi communication, the FEM circuitry 1400 may be configured to operate in the 2.4 GHz frequency spectrum, the 5 GHz frequency spectrum, or the 60 GHz frequency spectrum. In these embodiments, the receive signal path of the FEM circuitry 1400 may include a receive signal path duplexer 1414 to separate the signals from each spectrum as well as provide a separate LNA 1406 for each spectrum as shown. In these embodiments, the transmit signal path of the FEM circuitry 1400 may also include a power amplifier 1410 and a filter 1412, such as a BPF, an LPF or another type of filter for each frequency spectrum and a transmit signal path duplexer 1404 to provide the signals of one of the different spectrums onto a single transmit path for subsequent transmission by the one or more of the antennas 1301 (FIG. 1D). In some embodiments, BT communications may utilize the 2.4 GHz signal paths and may utilize the same FEM circuitry 1400 as the one used for WLAN communications.

Figure 1F:
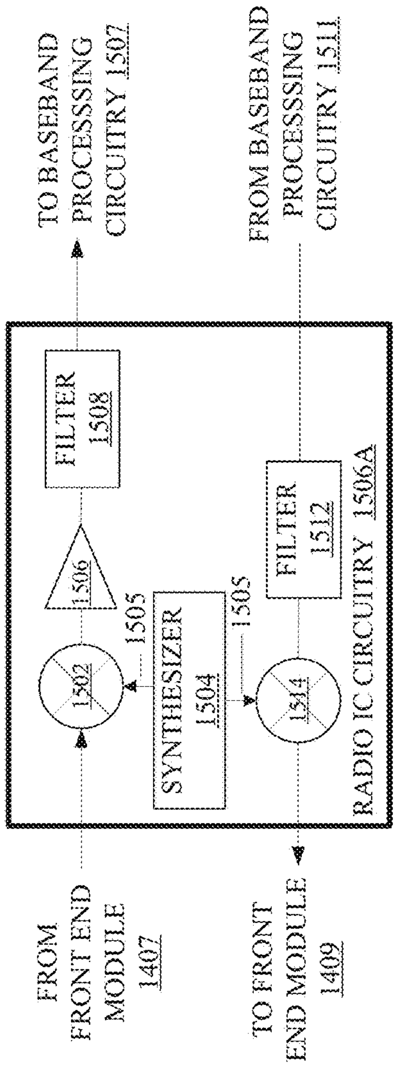
FIG. 1F illustrates an embodiment of radio integrated circuit (IC) circuitry of a wireless interface for STAs, such as the STAs in FIGS. 1A-C, to implement directional channel access logic circuitry.

FIG. 1F illustrates radio IC circuitry 1506*a* in accordance with some embodiments. The radio IC circuitry 1306*a* is one example of circuitry that may be suitable for use as the WLAN or BT radio IC circuitry 1306a/1306b (FIG. 1D), although other circuitry configurations may also be suitable. Alternatively, the example of FIG. 1F may be described in conjunction with the example BT radio IC circuitry 1306b.

In some embodiments, the radio IC circuitry 1306a may include a receive signal path and a transmit signal path. The receive signal path of the radio IC circuitry 1306a may include at least mixer circuitry 1502, such as, for example, down-conversion mixer circuitry, amplifier circuitry 1506 and filter circuitry 1508. The transmit signal path of the radio IC circuitry 1306a may include at least filter circuitry 1512 and mixer circuitry 1514, such as, for example, up-conversion mixer circuitry. Radio IC circuitry 1306a may also include synthesizer circuitry 1504 for synthesizing a frequency 1505 for use by the mixer circuitry 1502 and the mixer circuitry 1514. The mixer circuitry 1502 and/or 1514 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 1F illustrates only a simplified version of a radio IC circuitry, and may include, although not shown, embodiments where each of the depicted circuitries may include more than one component. For instance, mixer circuitry 1514 may each include one or more mixers, and filter circuitries 1508 and/or 1512 may each include one or more filters, such as one or more BPFs and/or LPFs according to application needs. For example, when mixer circuitries are of the direct-conversion type, they may each include two or more mixers.

In some embodiments, mixer circuitry 1502 may be configured to down-convert RF signals 1407 received from the FEM circuitry 1304a-b (FIG. 1D) based on the synthesized frequency 1505 provided by synthesizer circuitry 1504. The amplifier circuitry 1506 may be configured to amplify the down-converted signals and the filter circuitry 1508 may include an LPF configured to remove unwanted signals from the down-converted signals to generate output baseband signals 1507. Output baseband signals 1507 may be provided to the baseband processing circuitry 1308a-b (FIG. 1D) for further processing. In some embodiments, the output baseband signals 1507 may be zero-frequency baseband signals, although this is not a requirement. In some embodiments, mixer circuitry 1502 may comprise passive mixers, although the scope of the embodiments is not limited in this respect.

In some embodiments, the mixer circuitry 1514 may be configured to up-convert input baseband signals 1511 based on the synthesized frequency 1505 provided by the synthesizer circuitry 1504 to generate RF output signals 1409 for the FEM circuitry 1304a-b. The baseband signals 1511 may be provided by the baseband processing circuitry 1308a-b and may be filtered by filter circuitry 1512. The filter circuitry 1512 may include an LPF or a BPF, although the scope of the embodiments is not limited in this respect.

In some embodiments, the mixer circuitry 1502 and the mixer circuitry 1514 may each include two or more mixers and may be arranged for quadrature down-conversion and/or up-conversion respectively with the help of synthesizer 1504. In some embodiments, the mixer circuitry 1502 and the mixer circuitry 1514 may each include two or more mixers each configured for image rejection (e.g., Hartley image rejection). In some embodiments, the mixer circuitry 1502 and the mixer circuitry 1514 may be arranged for direct down-conversion and/or direct up-conversion, respectively. In some embodiments, the mixer circuitry 1502 and the mixer circuitry 1514 may be configured for super-heterodyne operation, although this is not a requirement.

Mixer circuitry 1502 may comprise, according to one embodiment: quadrature passive mixers (e.g., for the in-phase (I) and quadrature phase (Q) paths). In such an embodiment, RF input signal 1407 from FIG. 1F may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1505 of synthesizer 1504 (FIG. 1F). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction in power consumption.

The RF input signal 1407 (FIG. 1E) may comprise a balanced signal, although the scope of the embodiments is not limited in this respect. The I and Q baseband output signals may be provided to low-noise amplifier, such as amplifier circuitry 1506 (FIG. 1F) or to filter circuitry 1508 (FIG. 1F).

In some embodiments, the output baseband signals 1507 and the input baseband signals 1511 may be analog baseband signals, although the scope of the embodiments is not limited in this respect. In some alternate embodiments, the output baseband signals 1507 and the input baseband signals 1511 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1504 may be a fractional-N synthesizer or a fractional N/N+1 synthesizer, although the scope of the embodiments is not limited in this respect as other types of frequency synthesizers may be suitable. For example, synthesizer circuitry 1504 may be a delta-sigma synthesizer, a frequency multiplier, or a synthesizer comprising a phase-locked loop with a frequency divider. According to some embodiments, the synthesizer circuitry 1504 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1504 may be provided by a voltage controlled oscillator (VCO), although that is not a requirement. A divider control input may further be provided by either the baseband processing circuitry 1308*a-b* (FIG. 1D) depending on the desired output frequency 1505. In some embodiments, a divider control input (e.g., N) may be determined from a look-up table (e.g., within a Wi-Fi card) based on a channel number and a channel center frequency as determined or indicated by the example application processor 1310. The application processor 1310 may include, or otherwise be connected to, one of the example secure signal converter 101 or the example received signal converter 103 (e.g., depending on which device the example radio architecture is implemented in).

In some embodiments, synthesizer circuitry 1504 may be configured to generate a carrier frequency as the output frequency 1505, while in other embodiments, the output frequency 1505 may be a fraction of the carrier frequency (e.g., one-half the carrier frequency, one-third the carrier frequency). In some embodiments, the output frequency 1505 may be a LO frequency (fLO).

Figure 1G:
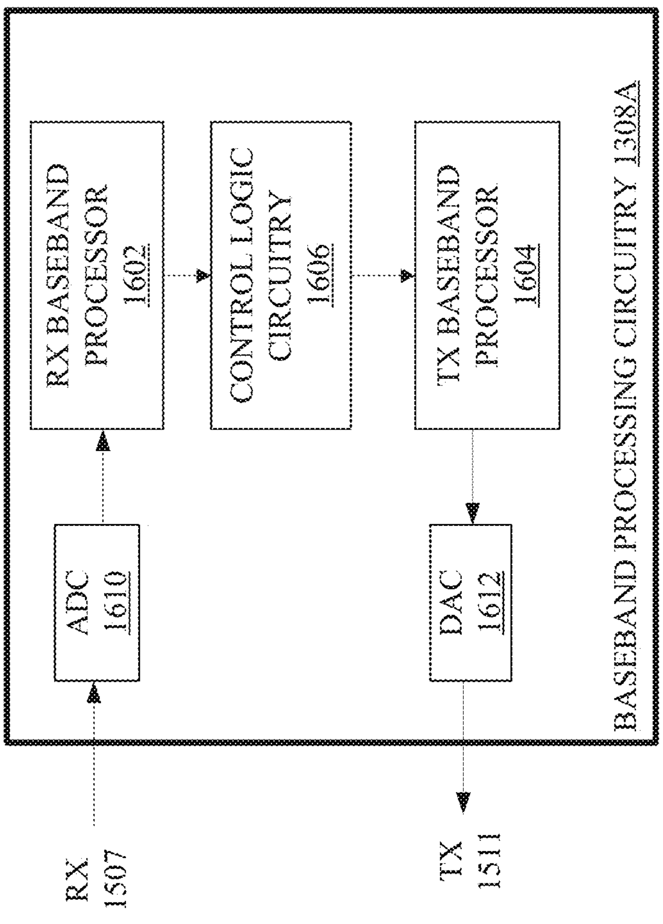
FIG. 1G illustrates an embodiment of baseband processing circuitry of a wireless interface for STAs, such as the STAs in FIGS. 1A-C, to implement directional channel access logic circuitry.

FIG. 1G illustrates a functional block diagram of baseband processing circuitry 1308*a* in accordance with some embodiments. The baseband processing circuitry 1308*a* is one example of circuitry that may be suitable for use as the baseband processing circuitry 1308*a* (FIG. 1D), although other circuitry configurations may also be suitable. Alternatively, the example of FIG. 1F may be used to implement the example BT baseband processing circuitry 1308*b* of FIG. 1D.

The baseband processing circuitry 1308*a* may include a receive baseband processor (RX BBP) 1602 for processing receive baseband signals 1509 provided by the radio IC circuitry 1306*a-b* (FIG. 1D) and a transmit baseband processor (TX BBP) 1604 for generating transmit baseband signals 1511 for the radio IC circuitry 1306*a-b*. The baseband processing circuitry 1308*a* may also include control logic 1606 for coordinating the operations of the baseband processing circuitry 1308*a*.

In some embodiments (e.g., when analog baseband signals are exchanged between the baseband processing circuitry 1308*a-b* and the radio IC circuitry 1306*a-b*), the baseband processing circuitry 1308*a* may include ADC 1610 to convert analog baseband signals 1609 received from the radio IC circuitry 1306*a-b* to digital baseband signals for processing by the RX BBP 1602. In these embodiments, the baseband processing circuitry 1308*a* may also include DAC 1612 to convert digital baseband signals from the TX BBP 1604 to analog baseband signals 1611.

In some embodiments that communicate OFDM signals or OFDMA signals, such as through baseband processor 1308*a*, the transmit baseband processor 1604 may be configured to generate OFDM or OFDMA signals as appropriate for transmission by performing an inverse fast Fourier transform (IFFT). The receive baseband processor 1602 may be configured to process received OFDM signals or OFDMA signals by performing an FFT. In some embodiments, the receive baseband processor 1602 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1D, in some embodiments, the antennas 1301 (FIG. 1D) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1301 may each include a set of phased-array antennas, although embodiments are not so limited.

Although the radio architecture 1300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Figures 2A, 2B, 2C:
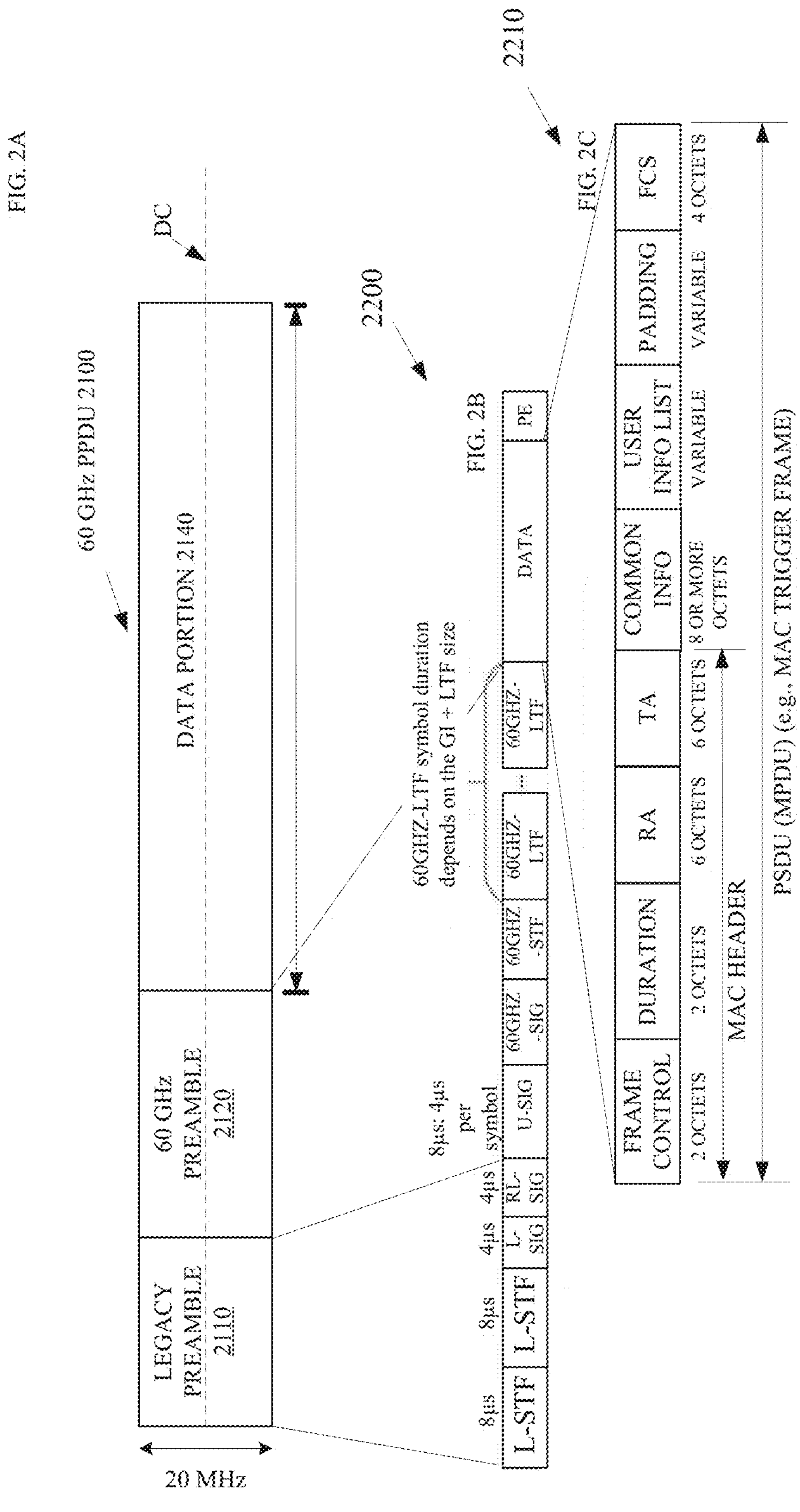
FIG. 2A depicts an embodiment of a 60 gigahertz (GHz) physical layer protocol data unit (PPDU) transmitted on an orthogonal frequency-division multiplexing (OFDM) modulated signal.
FIG. 2B depicts another embodiment of a 60 GHz PPDU.
FIG. 2C depicts an embodiment of a data field of a 60 GHz PPDU including a medium access control (MAC) frame.

FIG. 2A illustrates an embodiment of a 60 GHz PPDU 2100 in the form of an 802.11, orthogonal frequency division multiplexing (OFDM) packet on a 20 MHz channel of a 60 GHz link. In some embodiments, the baseband processing circuitry, such as the baseband processing circuitry 1218 in FIG. 1C, may transmit a 60 GHz PPDU 2100 transmission on the 60 GHz carrier frequency with beamforming. In some embodiments, the 60 GHz PPDU 2100 may comprise an MU trigger frame to identify a transmission opportunity (TxOP) for the target STAs or initiate a beamforming procedure for the target STAs.

The 60 GHz PPDU 2100 may comprise a legacy preamble 2110 to notify other devices in the vicinity of the source STA, such as an AP STA, that the 20 MHz channel is in use for a duration included in the legacy preamble 2110. The legacy preamble 2110 may comprise one or more short training fields (L-STFs), one or more long training fields (L-LTFs), and one or more signal fields (L-SIG and RL-SIG).

The 60 GHz PPDU 2100 may also comprise an 60 GHz preamble 2120 to identify a subsequent 60 GHz transmission as well as the STAs that are the targets of the transmission. Similarly, the 60 GHz preamble 2120 may comprise one or more short training fields (60 GHz-STFs), one or more long training fields (60 GHz-LTFs), and one or more signal fields (60 GHz-SIG).

After the 60 GHz preamble 2120, the 60 GHz PPDU 2100 may comprise a data portion 2140 that includes a single user (SU) or multiple user (MU) packet.

Figure 2D:
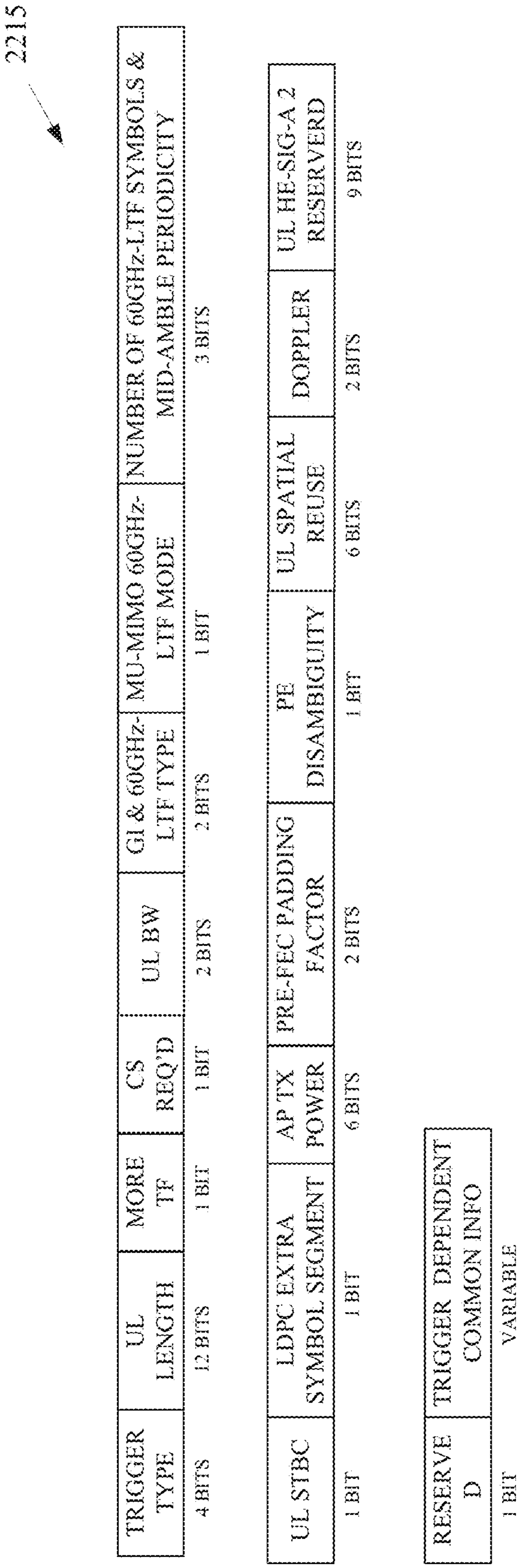
FIG. 2D depicts an embodiment of a common info field of the physical layer service data unit (PSDU) shown in FIG. 2B.
Figure 2E:
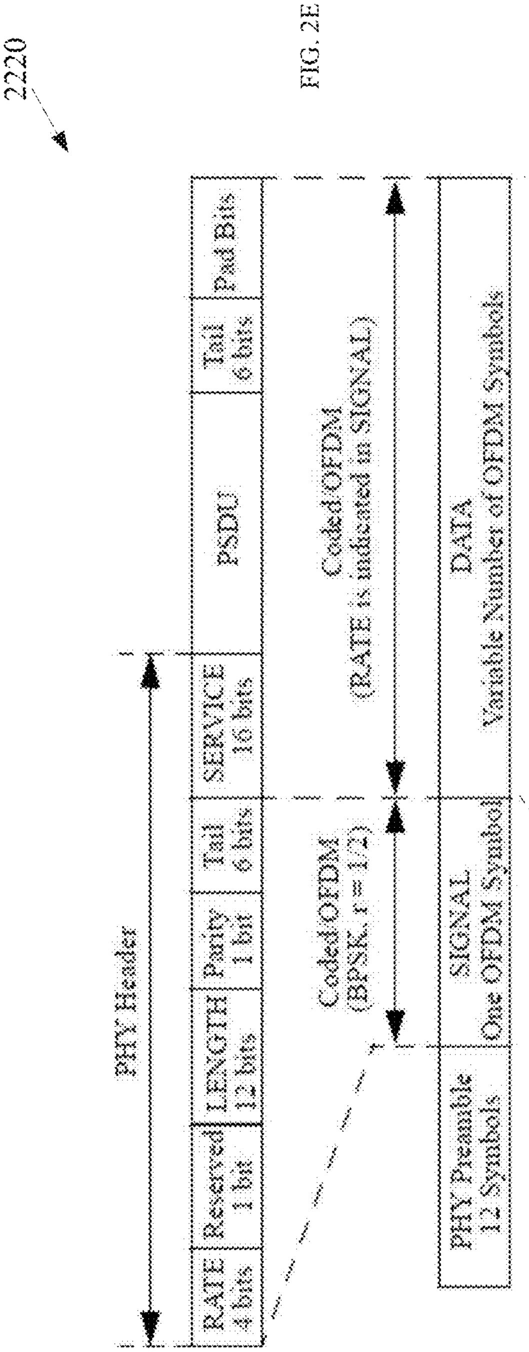
FIG. 2E depicts an embodiment of a PPDU.
Figure 2F:
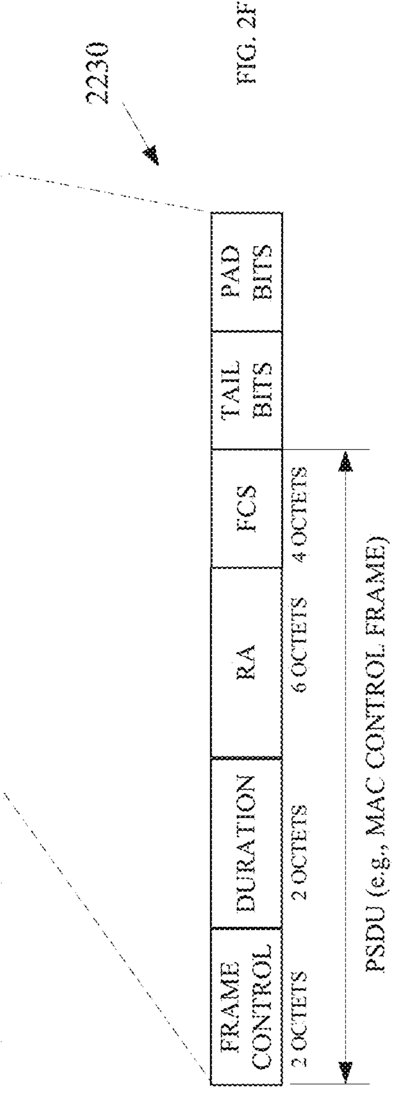
FIG. 2F depicts an embodiment of MAC control frame in a data field of a PPDU.

FIGS. 2B-C and FIG. 2F illustrate PPDU formats: a 60 GHz trigger frame and a 60 GHz control frame. In some embodiments, the 60 GHz PPDU 2100 may be a frame format used for a DL transmission to one or more STAs. In the 60 GHz PPDU 2100, the 60 GHZ-SIG field is present.

As illustrated in FIG. 2C, the data field of the 60 GHz PPDU 2100 may comprise a MAC frame 2210. The data field may comprise an MPDU (PSDU) such as a MAC trigger frame. The MAC trigger frame may include a 2 octet frame control field, a 2 octet duration field, a 6 octet receiver address (RA) field, a 6 octet transmitter address (TA) field, an 8 or more octet common info field, a variable user info list field, a padding field, and a 4 octet frame check sequence field comprising a value, such as a 32-bit cyclic redundancy code (CRC), to check the validity of and/or correct preceding frame.

The RA field of the RTS frame may comprise the address of the STA that is the intended immediate recipient of a pending individually addressed frame or a broadcast address if the frame is directed towards one or more group of STAs. The TA field may be the address of the STA transmitting the Trigger frame if the Trigger frame is addressed to STAs that belong to a single BSS. The TA field may be the transmitted basic service set identifier (BSSID) if the Trigger frame is addressed to STAs from at least two different BSSs of the multiple BSSID set.

The Duration field may be the time, in microseconds, required to transmit the pending Data or Management frame, plus, in some embodiments, one Ack frame and one or more short interframe spaces (SIFSs). If the calculated duration includes a fractional microsecond, that value may be rounded up to the next higher integer.

The Common Info field may include one or more fields with information about the trigger frame such as the trigger type and UL length, and may include a CS Required field that includes a one bit value to indicate whether a CCA is required by the recipient of the trigger frame to respond. For instance, if the trigger frame is transmitted in a directional transmission in a sector with more than one STA and the trigger frame is broadcast (transmitted with a broadcast address), then more than one STA may receive the trigger frame. In such situations, the CS Required field may include a value of, e.g., logical one to indicate that the recipient must perform a CCA such as a directional CCA or a quasi-omni CCA prior to responding the to the trigger frame. On the other hand, if the AP MLD only expects a single recipient STA to receive the trigger frame and, for any reason, determines that a transmission from the STA would not interfere with another communication, the CS Required field may include a logical zero as a field value to indicate that the recipient STA may transmit the response such as an ACK to the AP MLD without performing a directional CCA or a quasi-omni CCA.

The user info List field may include zero or more User Info fields. Each User Info Fields may include fields to identify a STA as well as information about a response to a trigger frame. The padding field may include padding bits and the frame check sequence (FCS) field may include a sequence of bits such as a 32-bit cyclic redundancy check (CRC).

FIG. 2D depicts an embodiment of the common info field 2215 of the PSDU 2210 shown in FIG. 2C. The Common Info field 2215 may include a Trigger Type subfield that identifies the Trigger frame variant and its encoding. The UL Length subfield of the Common Info field indicates the value of the L-SIG LENGTH field of the solicited trigger-based (TB) PPDU. The More TF subfield of the Common Info field indicates whether or not a subsequent Trigger frame is scheduled for transmission.

The CS Required subfield of the Common Info field is set to 1 to indicate that the STAs identified in the User Info fields are required to use ED to sense the medium and to consider the medium state and the network allocation vector (NAV) in determining whether or not to respond. The CS Required subfield is set to 0 to indicate that the STAs identified in the User Info fields are not required to consider the medium state or the NAV in determining whether or not to respond.

The UL bandwidth (BW) subfield of the Common Info field indicates the bandwidth in the 60 GHz-SIG-A of the TB PPDU. The GI And 60 GHz-LTF Type subfield of the Common Info field indicates the GI and 60 GHz-LTF type of the TB PPDU response.

The MU-MIMO 60 GHZ-LTF Mode subfield of the Common Info field indicates the 60 GHz-LTF mode for a TB PPDU that has an RU that spans the entire bandwidth and that is assigned to more than one non-AP STA (i.e., for UL MU-MIMO). Otherwise, this subfield is set to indicate 60 GHz single stream pilot 60 GHz-LTF mode.

If the Doppler subfield of the Common Info field is 0, then the Number Of 60 GHz-LTF Symbols And Midamble Periodicity subfield of the Common Info field indicates the number of 60 GHz-LTF symbols present in the TB PPDU. If the Doppler subfield of the Common Info field is 1, then the Number Of 60 GHz-LTF Symbols And Midamble Periodicity subfield indicates the number of 60 GHz-LTF symbols and the periodicity of the midamble.

The UL STBC subfield of the Common Info field indicates the status of STBC encoding for the solicited 60 GHz TB PPDUs. It is set to 1 to indicate STBC encoding and set to 0 otherwise. The LDPC Extra Symbol Segment subfield of the Common Info field indicates the status of the LDPC extra symbol segment. It is set to 1 if the LDPC extra symbol segment is present in the solicited 60 GHz TB PPDUs and set to 0 otherwise.

The AP Tx Power subfield of the Common Info field indicates the AP's combined transmit power at the transmit antenna connector of all the antennas used to transmit the triggering PPDU in units of dBm/20 MHz. The Pre-FEC Padding Factor and PE Disambiguity subfields may include one or more predefined settings. The UL Spatial Reuse subfield of the Common Info field carries the values to be included in the Spatial Reuse fields in the 60 GHz-SIG-A field of the solicited TB PPDUs.

The Doppler subfield of the Common Info field is set to 1 to indicate that a midamble is present in the TB PPDU and set to 0 otherwise. The UL 60 GHz-SIG-A2 Reserved subfield of the Common Info field carries the value to be included in the Reserved field in the 60 GHz-SIG-A2 subfield of the solicited TB PPDUs. An 60 GHz AP sets the UL 60 GHZ-SIG-A2 Reserved subfield to all 1s. And the Trigger Dependent Common Info subfield in the Common Info field is optionally present based on the value of the Trigger Type field. Note that other embodiments may include different combinations of fields, different fields, more fields, or less fields.

FIG. 2E illustrates an example of a PPDU 2220 with a control frame that may be transmitted by an MLD STA to an AP MLD via a 60 GHz link in response to receipt of a trigger frame. The PPDU 2220 format may be used for a transmission that is a response to a triggering frame from an AP STA.

In some embodiments, the response may be a MAC data frame or a MAC control frame.

The PPDU 2220 format may comprise an OFDM PHY preamble, an OFDM PHY header, a PSDU, tail bits, and pad bits. The PHY header may contain the following fields: length, rate, a reserved bit, an even parity bit, and the service field. in terms of modulation, the length, rate, reserved bit, and parity bit (with 6 zero tail bits appended) may constitute a separate single OFDM symbol, denoted signal, which is transmitted with the combination of BPSK modulation and a coding rate of R=½.

The PSDU (with 6 zero tail bits and pad bits appended), denoted as data, may be transmitted at the data rate described in the rate field and may constitute multiple OFDM symbols. The tail bits in the signal symbol may enable decoding of the rate and length fields immediately after reception of the tail bits. The rate and length fields may be required for decoding the data field of the PPDU.

The data field of the PPDU 2220 may comprise an MPDU such as a MAC control frame 2230. The MAC control frame 2230 may include a 2 octet frame control field, a 2 octet duration field, a 6 octet RA field, and a 4 octet frame check sequence field comprising a value, such as a 32-bit CRC, to check the validity of and/or correct preceding frame. In some embodiments, the MAC control frame 2230 may be generated in response to receipt by a STA of a MAC trigger frame such as the 60 GHz PPDU 2100.

In several embodiments, the value of the RA field of the MAC control frame is set to the address from the TA field of the trigger frame.

Figure 2G:
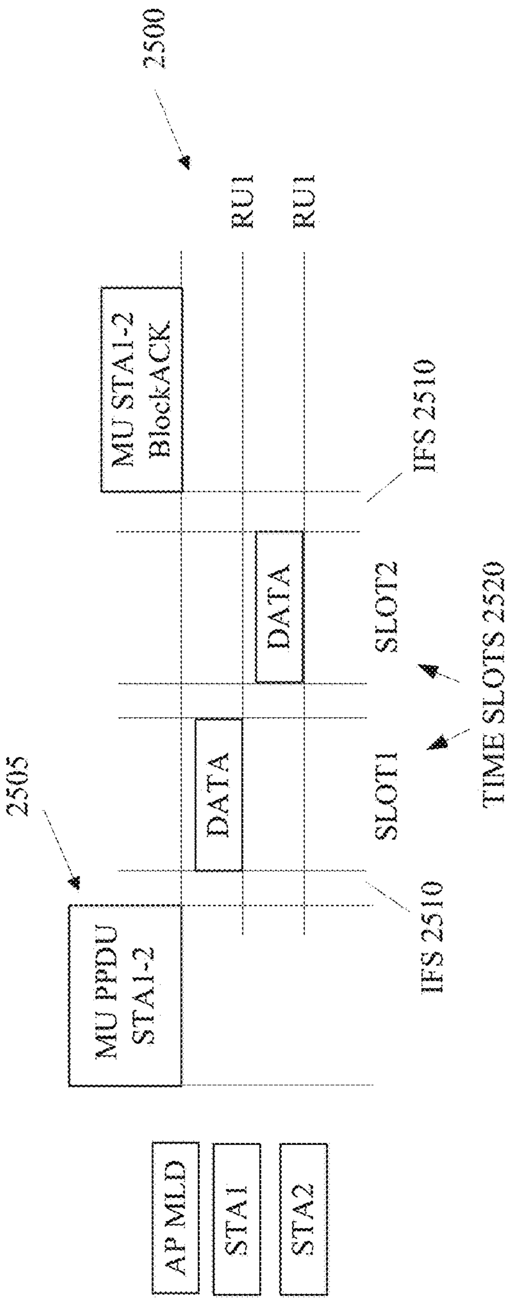
FIG. 2G depicts an embodiment of a timing diagram for a beacon frame, a data frame, and an acknowledgement frame for directional channel access.

FIGS. 2G-K illustrate different timing diagrams 2500, 2600, and 2700 for communications between an AP-MLD and STA 1 and STA 2. In FIG. 2G, directional channel access logic circuitry of the AP MLD may perform a quasi-omni CCA or directional CCA in a first sector, receive a CCA report indicating that the 60 GHz link is idle, and transmit a MU PPDU that is addressed to STA1 and STA2 or broadcast the MU PPDU 2505. The STA1 and STA2 may reside in a first sector direction from the AP MLD so the AP MLD may transmit the MU PPDU 2505 as a directional transmission in the first sector. The MU PPDU 2505 may include a beacon frame or other frame to describe time slots 2520 for communications with the STA1 and STA2 on a first resource unit (RU1) of the channel bandwidth of, e.g., 20 megahertz (MHz), 40 MHz, 80 MHz, 160 MHz, an/or other bandwidths that are either contiguous or non-contiguous.

The directional channel access logic circuitry of the STA1, based on the MU PPDU 2505, may have a data frame in a transmit queue and may begin a directional CCA in the sector of the AP MLD an interframe space (IFS) 2510, such as a short interframe space (SIFS), after transmission of the MU PPDU 2505. If the directional CCA reports an idle 60 GHz link on RU1, the STA1 may transmit the data packet during slot1 2520 to the AP MLD on the RU1.

The directional channel access logic circuitry of the STA2, based on the MU PPDU 2505, may have a data frame in a transmit queue and may begin a directional CCA in the sector of the AP MLD an (IFS) 2510 after the data packet transmission by the STA1. If the directional CCA reports an idle 60 GHz link on RU1, the STA2 may transmit the data packet during slot2 2520 to the AP MLD on the RU1.

The AP MLD may receive the data packets from the STA1 and STA2. An IFS 2510 thereafter, the AP MLD may perform a directional CCA in the first sector towards the STA1 and STA2, and, in response to a directional CCA indication that the 60 GHz link for the first sector is idle, the AP MLD may transmit a MU ACK to the STA1 and STA2 to acknowledge receipt of the data packets.

Figure 2H:
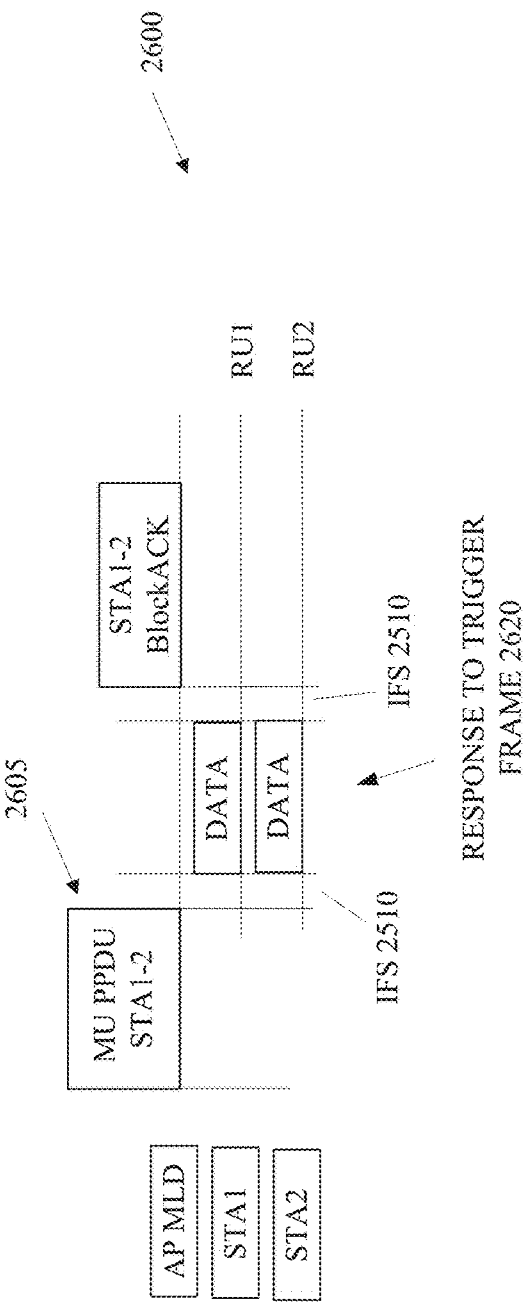
FIG. 2H depicts an embodiment of a timing diagram for a trigger frame, a data frame, and an acknowledgement frame for directional channel access.

FIG. 2H depicts an embodiment of a timing diagram for a trigger frame, a data frame, and an acknowledgement frame for directional channel access. In FIG. 2G, directional channel access logic circuitry of the AP MLD may perform a quasi-omni CCA or directional CCA in a first sector, receive a CCA report indicating that the 60 GHz link is idle, and transmit a MU PPDU 2605 that is addressed to the STA1 and STA2 or broadcast the MU PPDU 2605. The STA1 and STA2 may reside in a first sector direction from the AP MLD so the AP MLD may transmit the MU PPDU as a directional transmission in the first sector. The MU PPDU may include a trigger frame or other frame 2605 to trigger communications with STA1 via RU1 and with STA2 RU2 of the AP MLD's channel bandwidth of, e.g., 20 megahertz (MHz), 40 MHZ, 80 MHz, 160 MHZ, an/or other bandwidths that are either contiguous or non-contiguous.

The directional channel access logic circuitry of the STA1, based on the MU PPDU 2605, may have a data frame in a transmit queue and may begin a directional CCA in the sector of the AP MLD an interframe space (IFS) 2510, such as a short interframe space (SIFS), after transmission of the MU PPDU 2605. If the directional CCA reports an idle 60 GHz link on RU1, the STA1 may transmit the data packet during slot to the AP MLD on RU1.

The directional channel access logic circuitry of the STA2, based on the MU PPDU 2605, may have a data frame in a transmit queue and may begin a directional CCA in the sector of the AP MLD an interframe space (IFS) 2510 after transmission of the MU PPDU 2605. If the directional CCA reports an idle 60 GHz link on RU2, the STA2 may transmit the data packet during slot to the AP MLD on RU2.

The AP MLD may receive the data packets from the STA1 and STA2. An IFS 2510 thereafter, the AP MLD may perform a directional CCA in the first sector towards the STA1 and STA2, and, in response to a directional CCA indication that the 60 GHz link for the first sector is idle, the AP MLD may transmit a MU ACK to the STA1 and STA2 to acknowledge receipt of the data packets.

FIG. 3 depicts an embodiment of an apparatus to generate, transmit, receive, and interpret or decode PHY frames and MAC frames. The apparatus comprises a transceiver 3000 coupled with baseband processing circuitry 3001. The baseband processing circuitry 3001 may comprise a MAC logic circuitry 3091 and PHY logic circuitry 3092. In other embodiments, the baseband processing circuitry 3001 may be included on the transceiver 3000.

The MAC logic circuitry 3091 and PHY logic circuitry 3092 may comprise code executing on processing circuitry of a baseband processing circuitry 3001; circuitry to implement operations of functionality of the MAC or PHY; or a combination of both. In the present embodiment, the MAC logic circuitry 3091 and PHY logic circuitry 3092 may comprise directional channel access logic circuitry 3093 to implement directional channel access protocols for the apparatus.

The MAC logic circuitry 3091 may determine a frame such as a MAC control frame and the PHY logic circuitry 3092 may determine the physical layer protocol data unit (PPDU) by prepending the frame, also called a MAC protocol data unit (MPDU), with a physical layer (PHY) preamble for transmission of the MAC control frame via the antenna array 3018 and cause transmission of the MAC control frame in the PPDU.

The transceiver 3000 comprises a receiver 3004 and a transmitter 3006. Embodiments have many different combinations of modules to process data because the configurations are deployment specific. FIG. 3 illustrates some of the modules that are common to many embodiments. In some embodiments, one or more of the modules may be implemented in circuitry separate from the baseband processing circuitry 3001. In some embodiments, the baseband processing circuitry 3001 may execute code in processing circuitry of the baseband processing circuitry 3001 to implement one or more of the modules.

In the present embodiment, the transceiver 3000 also includes WUR circuitry 3110 and 3120 such as the WUR circuitry 1024 and 1054, respectively, shown in FIG. 1A. The WUR circuitry 3110 may comprise circuitry to use portions of the transmitter 3006 (a transmitter of the wireless communications I/F) to generate a WUR packet. For instance, the WUR circuitry 3110 may generate, e.g., an OOK signal with OFDM symbols to generate a WUR packet for transmission via the antenna array 3018. In other embodiments, the WUR may comprise an independent circuitry that does not use portions of the transmitter 3006.

Note that a station such as the STA 1210 in FIG. 1C may comprise multiple transmitters to facilitate concurrent transmissions on multiple contiguous and/or non-contiguous carrier frequencies.

The transmitter 3006 may comprise one or more of or all the modules including an encoder 3008, a stream deparser 3066, a frequency segment parser 3007, an interleaver 3009, a modulator 3010, a frequency segment deparser 3060, an OFDM 3012, an Inverse Fast Fourier Transform (IFFT) module 3015, a GI module 3045, and a transmitter front end 3040. The encoder 3008 of transmitter 3006 receives and encodes a data stream destined for transmission from the MAC logic circuitry 3091 with, e.g., a binary convolutional coding (BCC), a low-density parity check coding (LDPC), and/or the like. After coding, scrambling, puncturing and post-FEC (forward error correction) padding, a stream parser 3064 may optionally divide the data bit streams at the output of the FEC encoder into groups of bits. The frequency segment parser 3007 may receive data stream from encoder 3008 or streams from the stream parser 3064 and optionally parse each data stream into two or more frequency segments to build a contiguous or non-contiguous bandwidth based upon smaller bandwidth frequency segments. The interleaver 3009 may interleave rows and columns of bits to prevent long sequences of adjacent noisy bits from entering a BCC decoder of a receiver.

The modulator 3010 may receive the data stream from interleaver 3009 and may impress the received data blocks onto a sinusoid of a selected frequency for each stream via, e.g., mapping the data blocks into a corresponding set of discrete amplitudes of the sinusoid, or a set of discrete phases of the sinusoid, or a set of discrete frequency shifts relative to the frequency of the sinusoid. In some embodiments, the output of modulator 3010 may optionally be fed into the frequency segment deparser 3060 to combine frequency segments in a single, contiguous frequency bandwidth of, e.g., 320 MHz. Other embodiments may continue to process the frequency segments as separate data streams for, e.g. a non-contiguous 160+160 MHz bandwidth transmission.

After the modulator 3010, the data stream(s) are fed to an OFDM 3012. The OFDM 3012 may comprise a space-time block coding (STBC) module 3011, and a digital beamforming (DBF) module 3014. The STBC module 3011 may receive constellation points from the modulator 3010 corresponding to one or more spatial streams and may spread the spatial streams to a greater number of space-time streams. Further embodiments may omit the STBC.

The OFDM 3012 impresses or maps the modulated data formed as OFDM symbols onto a plurality of orthogonal subcarriers so the OFDM symbols are encoded with the subcarriers or tones. The OFDM symbols may be fed to the DBF module 3014. Generally, digital beam forming uses digital signal processing algorithms that operate on the signals received by, and transmitted from, an array of antenna elements. Transmit beamforming processes the channel state to compute a steering matrix that is applied to the transmitted signal to optimize reception at one or more receivers. This is achieved by combining elements in a phased antenna array in such a way that signals at particular angles experience constructive interference while others experience destructive interference.

The IFFT module 3015 may perform an inverse discrete Fourier transform (IDFT) on the OFDM symbols to map on the subcarriers. The guard interval (GI) module 3045 may insert guard intervals by prepending to the symbol a circular extension of itself. The GI module 3045 may also comprise windowing to optionally smooth the edges of each symbol to increase spectral decay.

The output of the GI module 3045 may enter the radio 3042 to convert the time domain signals into radio signals by combining the time domain signals with subcarrier frequencies to output into the transmitter front end module (TX FEM) 3040. The transmitter front end 3040 may comprise a power amplifier (PA) 3044 to amplify the signal and prepare the signal for transmission via the antenna array 3018. In many embodiments, entrance into a spatial reuse mode by a communications device such as a station or AP may reduce the amplification by the PA 3044 to reduce channel interference caused by transmissions.

The transceiver 3000 may also comprise duplexers 3016 connected to antenna array 3018. The antenna array 3018 radiates the information bearing signals into a time-varying, spatial distribution of electromagnetic energy that can be received by an antenna of a receiver. In several embodiments, the receiver 3004 and the transmitter 3006 may each comprise its own antenna(s) or antenna array(s).

The transceiver 3000 may comprise a receiver 3004 for receiving, demodulating, and decoding information bearing communication signals. The receiver 3004 may comprise a receiver front-end module (RX FEM) 3050 to detect the signal, detect the start of the packet, remove the carrier frequency, and amplify the subcarriers via a low noise amplifier (LNA) 3054 to output to the radio 3052. The radio 3052 may convert the radio signals into time domain signals to output to the GI module 3055 by removing the subcarrier frequencies from each tone of the radio signals.

The receiver 3004 may comprise a GI module 3055 and a fast Fourier transform (FFT) module 3019. The GI module 3055 may remove the guard intervals and the windowing and the FFT module 3019 may transform the communication signals from the time domain to the frequency domain.

The receiver 3004 may also comprise an OFDM 3022, a frequency segment parser 3062, a demodulator 3024, a deinterleaver 3025, a frequency segment deparser 3027, a stream deparser 3066, and a decoder 3026. An equalizer may output the weighted data signals for the OFDM packet to the OFDM 3022. The OFDM 3022 extracts signal information as OFDM symbols from the plurality of subcarriers onto which information-bearing communication signals are modulated.

The OFDM 3022 may comprise a DBF module 3020, and an STBC module 3021. The received signals are fed from the equalizer to the DBF module 3020. The DBF module 3020 may comprise algorithms to process the received signals as a directional transmission directed toward to the receiver 3004. And the STBC module 3021 may transform the data streams from the space-time streams to spatial streams.

The output of the STBC module 3021 may enter a frequency segment parser 3062 if the communication signal is received as a single, contiguous bandwidth signal to parse the signal into, e.g., two or more frequency segments for demodulation and deinterleaving.

The demodulator 3024 demodulates the spatial streams. Demodulation is the process of extracting data from the spatial streams to produce demodulated spatial streams. The deinterleaver 3025 may deinterleave the sequence of bits of information. The frequency segment deparser 3027 may optionally deparse frequency segments as received if received as separate frequency segment signals or may deparse the frequency segments determined by the optional frequency segment parser 3062. The decoder 3026 decodes the data from the demodulator 3024 and transmits the decoded information, the MPDU, to the MAC logic circuitry 3091.

The MAC logic circuitry 3091 may parse the MPDU based upon a format defined in the communications device for a frame to determine the particular type of frame by determining the type value and the subtype value. The MAC logic circuitry 3091 may then interpret the remainder of MPDU.

While the description of FIG. 3 focuses primarily on a single spatial stream system for simplicity, many embodiments are capable of multiple spatial stream transmissions and use parallel data processing paths for multiple spatial streams from the PHY logic circuitry 3092 through to transmission. Further embodiments may include the use of multiple encoders to afford implementation flexibility.

Figure 4A:
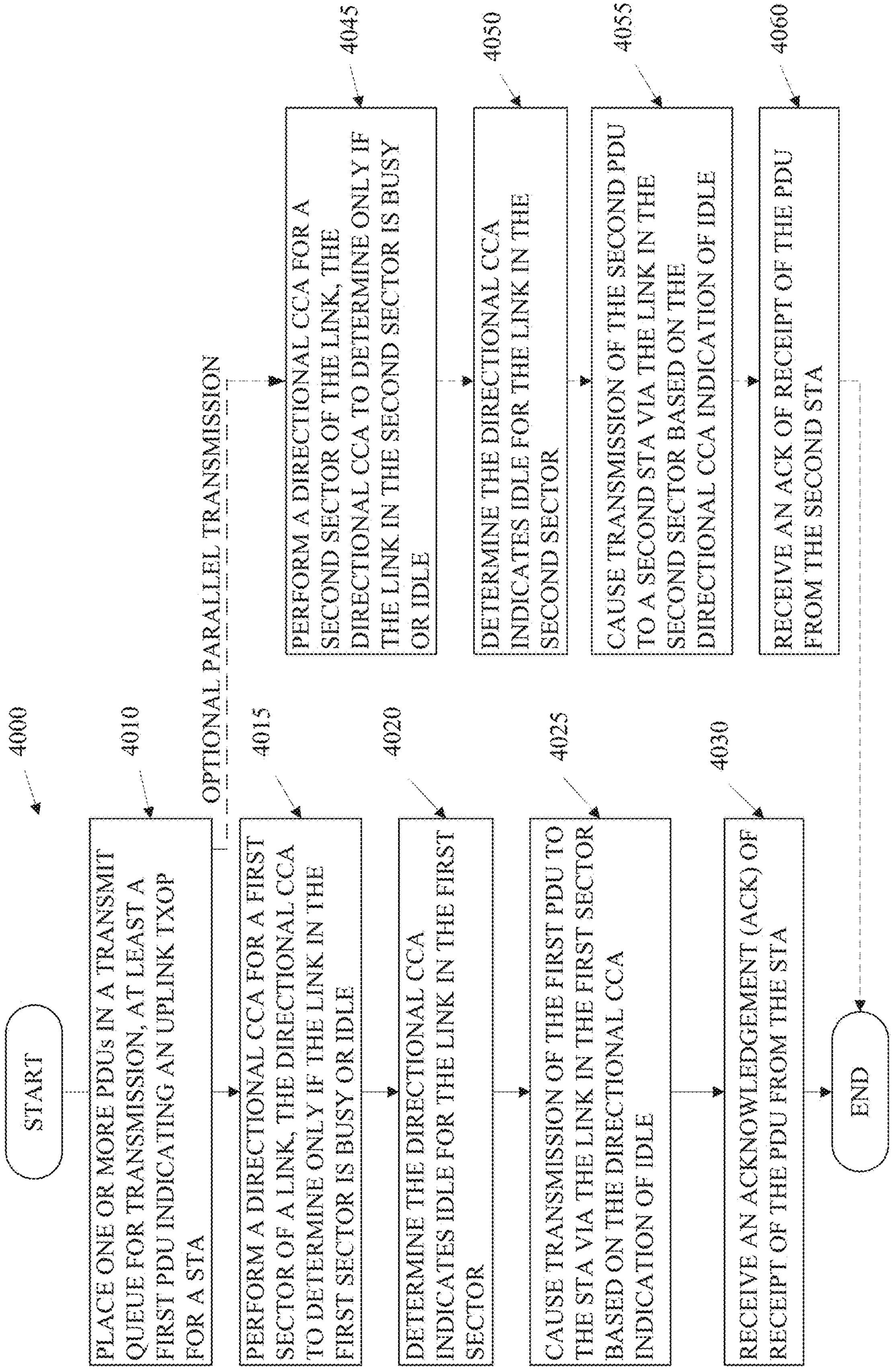
FIG. 4A depicts an embodiment of a flowchart to implement directional channel access logic circuitry.

FIG. 4A depicts an embodiment of a flowchart 4000 to implement directional channel access logic circuitry. At element 4010, directional channel access logic circuitry of an AP MLD (e.g., the directional channel access logic circuitry 1220 of the AP MLD 1210 or the directional logic circuitry 1250 of MLD STA 1230 shown FIG. 1C) may place one or more PDUs in a transmit queue for transmission via a 60 GHz link. The one or more PDUs may include at least a first PDU and the first PDU may indicate an UL TxOP for a STA.

At element 4015, the AP MLD may perform a directional CCA for a first sector of a link. The directional CCA may determine only if the link in the first sector of the 60 GHz link is busy or idle. If the directional CCA indicates that the 60 GHz link is busy in the first sector, the AP MLD may perform a backoff procedure.

At element 4020, the AP MLD may determine that the directional CCA indicates idle for the first sector of the 60 GHz link. At element 4025, the AP MLD may cause transmission of the first PDU to the STA via the first sector of the 60 GHz link in response to the directional CCA indication of idle. Thereafter, at element 4030, the AP MLD may receive an acknowledgement (ACK) of receipt of the PDU from the STA. It is understood that the above descriptions are for purposes of illustration and are not meant to be limiting.

In some embodiments, the AP MLD may optionally, independently, and/or concurrently transmit a parallel transmission. For instance, at element 4045, the AP MLD may perform a directional CCA for a second sector of the 60 GHz link, the directional CCA to determine only if the second sector of the 60 GHz link is busy or idle.

In response, the CCA may return a report indicating whether the second sector of the 60 GHz link is busy or idle. At element 4050, the AP MLD may determine that the directional CCA indicates the second sector of the 60 GHz link is idle. At element 4055, the AP MLD may respond to the directional CCA indication of idle by causing the transmission of the second PDU to a second STA via the second sector of the 60 GHz link.

At element 4060, the AP MLD may receive an acknowledgement (ACK) of receipt of the second PDU from the second STA.

Figure 4B:
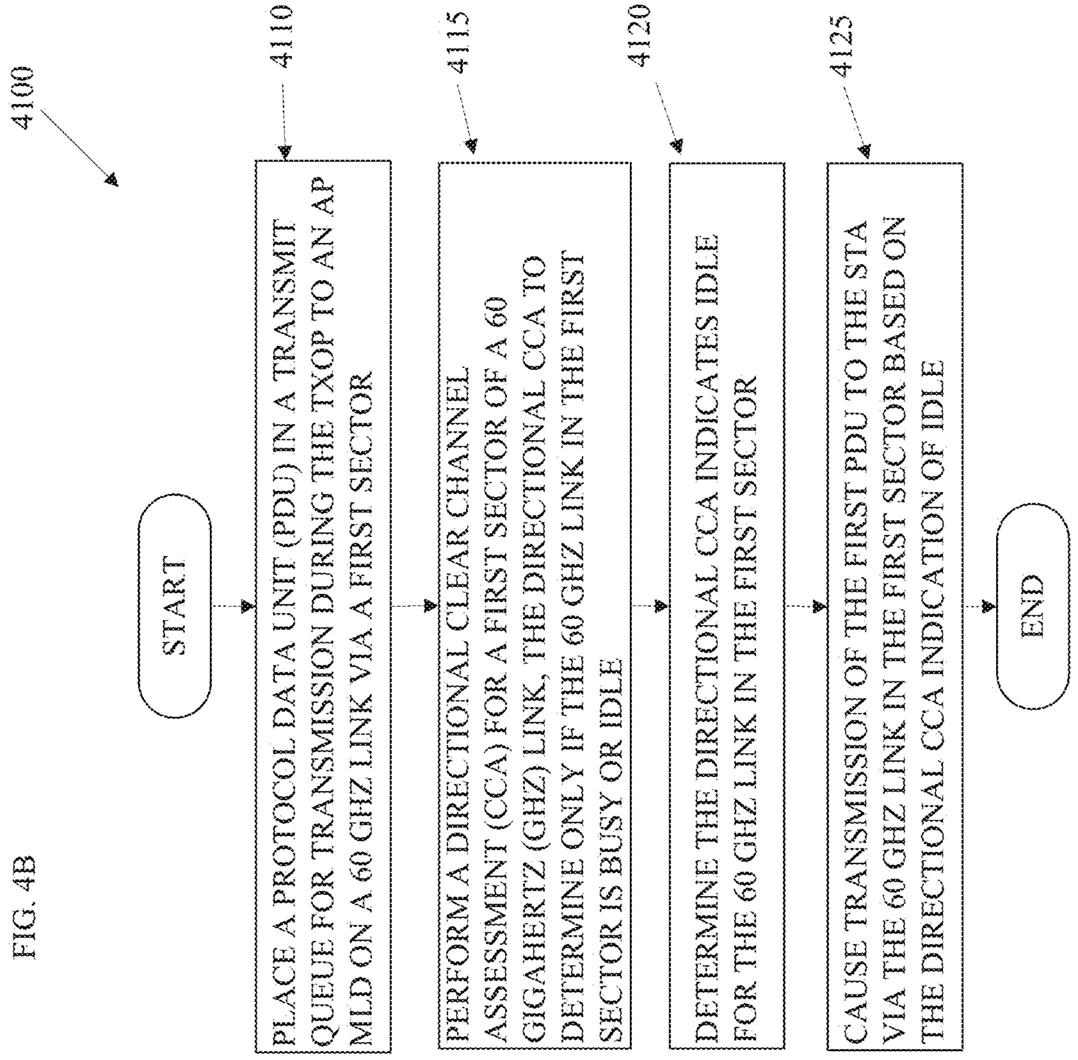
FIG. 4B depicts another embodiment of a flowchart to implement directional channel access logic circuitry.

FIG. 4B depicts another embodiment of a flowchart 4100 to implement directional channel access logic circuitry. At element 4110, directional channel access logic circuitry of a non-AP MLD (e.g., the directional channel access logic circuitry 1220 of the AP MLD 1210 or the directional logic circuitry 1250 of MLD STA 1230 shown FIG. 1C) may place a protocol data unit (PDU) in a transmit queue for transmission during the TxOP to an AP MLD on a 60 gigahertz (GHz) link via a first sector. The non-AP MLD may transmit the PDU in response to receipt of a packet from the AP MLD assigning the non-AP MLD to the TxOP.

At element 4115, the non-AP MLD may perform a directional clear channel assessment (CCA) for a first sector of a 60 gigahertz (GHz) link and the directional CCA may determine only if the 60 GHz link in the first sector is busy or idle. In other words, the non-AP MLD may only check the sector in which the non-AP MLD intends to transmit to determine if the 60 GHz link is busy or idle.

In element 4120, the non-AP MLD may determine the directional CCA indicates idle for the 60 GHz link in the first sector and may cause transmission of the first PDU to the STA via the 60 GHz link in the first sector based on the directional CCA indication of idle (element 4125).

Figure 4D:
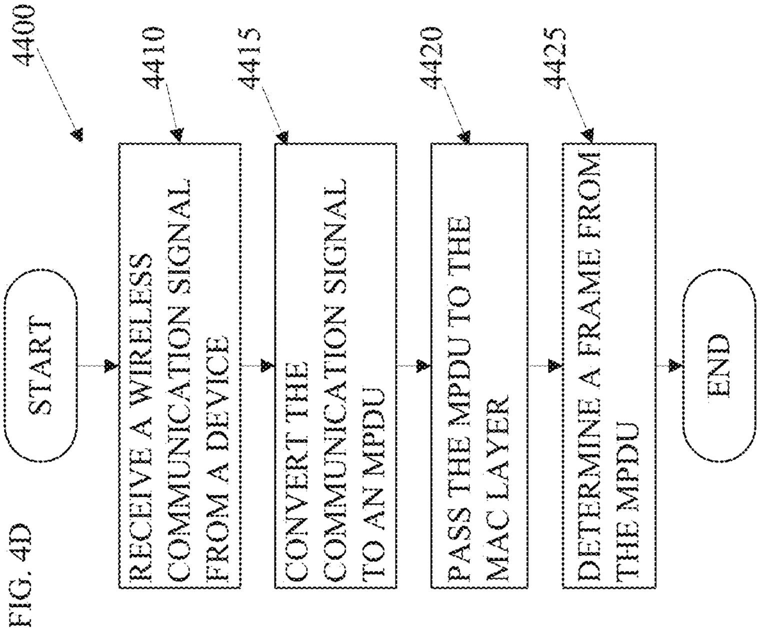
FIGS. 4C-D depict embodiments of flowcharts to generate and transmit frames and receive and interpret frames for communications between wireless communication devices.
Figure 4C:
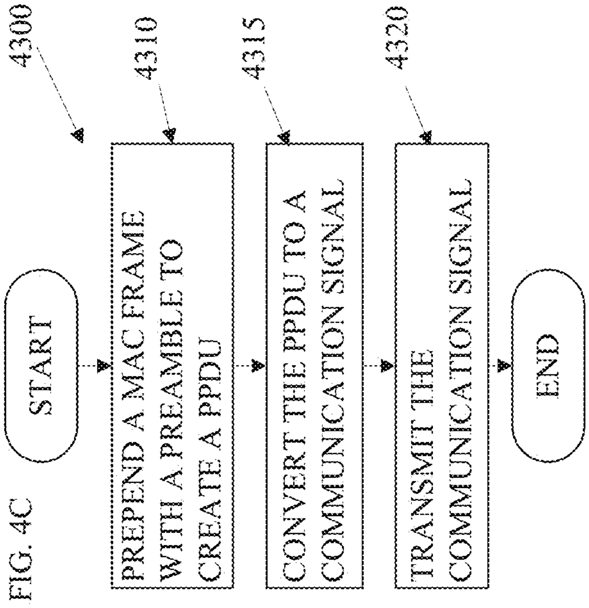

FIGS. 4C-D depict embodiments of flowcharts 4300 and 4410 to transmit, receive, and interpret communications with a frame. Referring to FIG. 4C, the flowchart 4300 may begin with receiving an MU frame from the wireless communications I/F 1216 of the STA 1210 by the wireless communications I/Fs (such as wireless communications I/F 1246 of the STA 1230, STA 1290, STA 1292, and STA 1296 as shown in FIG. 1C. The MAC layer logic circuitry, such as the MAC logic circuitry 3091 in FIG. 1C, of each STA of STA 1230, STA 1290, STA 1292, and STA 1296 may generate a control frame responsive to the MU frame to transmit to the STA 1210 as an control frame to the STA 1210 and may pass the frame as an MAC protocol data unit (MPDU) to a PHY logic circuitry such as the PHY logic circuitry 3092 in FIG. 1C. The PHY logic circuitry may also encode and transform the PPDU into OFDM symbols for transmission to the STA 1210. The PHY logic circuitry may generate a preamble to prepend the PHY service data unit (PSDU) (the MPDU) to form a PHY protocol data unit (PPDU) for transmission (element 4310).

The physical layer device such as the transmitter 3006 in FIG. 3 or the wireless network interfaces 1222 and 1252 in FIG. 1A may convert the PPDU to a communication signal via a radio (element 4315). The transmitter may then transmit the communication signal via the antenna coupled with the radio (element 4320).

Referring to FIG. 4D, the flowchart 4400 begins with a receiver of a device such as the receiver 3004 in FIG. 3 receiving a communication signal via one or more antenna(s) such as an antenna element of antenna array 3018 (element 4410). The receiver may convert the communication signal into an MPDU in accordance with the process described in the preamble (element 4415). More specifically, the received signal is fed from the one or more antennas to a DBF such as the DBF 220. The DBF transforms the antenna signals into information signals. The output of the DBF is fed to OFDM such as the OFDM 3022 in FIG. 3. The OFDM extracts signal information from the plurality of subcarriers onto which information-bearing signals are modulated. Then, the demodulator such as the demodulator 3024 demodulates the signal information via, e.g., BPSK, 16-QAM (quadrature amplitude modulation), 64-QAM, 256-QAM, 1024-QAM, or 4096-QAM with a forward error correction (FEC) coding rate (½, ⅔, ¾, or ⅚). And the decoder such as the decoder 3026 decodes the signal information from the demodulator via, e.g., BCC or LDPC, to extract the MPDU and pass or communicate the MPDU to MAC layer logic circuitry such as MAC logic circuitry 3091 (element 4420).

The MAC logic circuitry may determine frame field values from the MPDU (element 4425) such as the control frame fields in the control frame shown in FIG. 2F. For instance, the MAC logic circuitry may determine frame field values such as the type and subtype field values of the control frame. The MAC logic circuitry may determine that the MPDU comprises a control frame so the MAC logic circuitry may generate a frame in response if the sub-band of the channel is clear according to a directional CCA.

Figure 5:
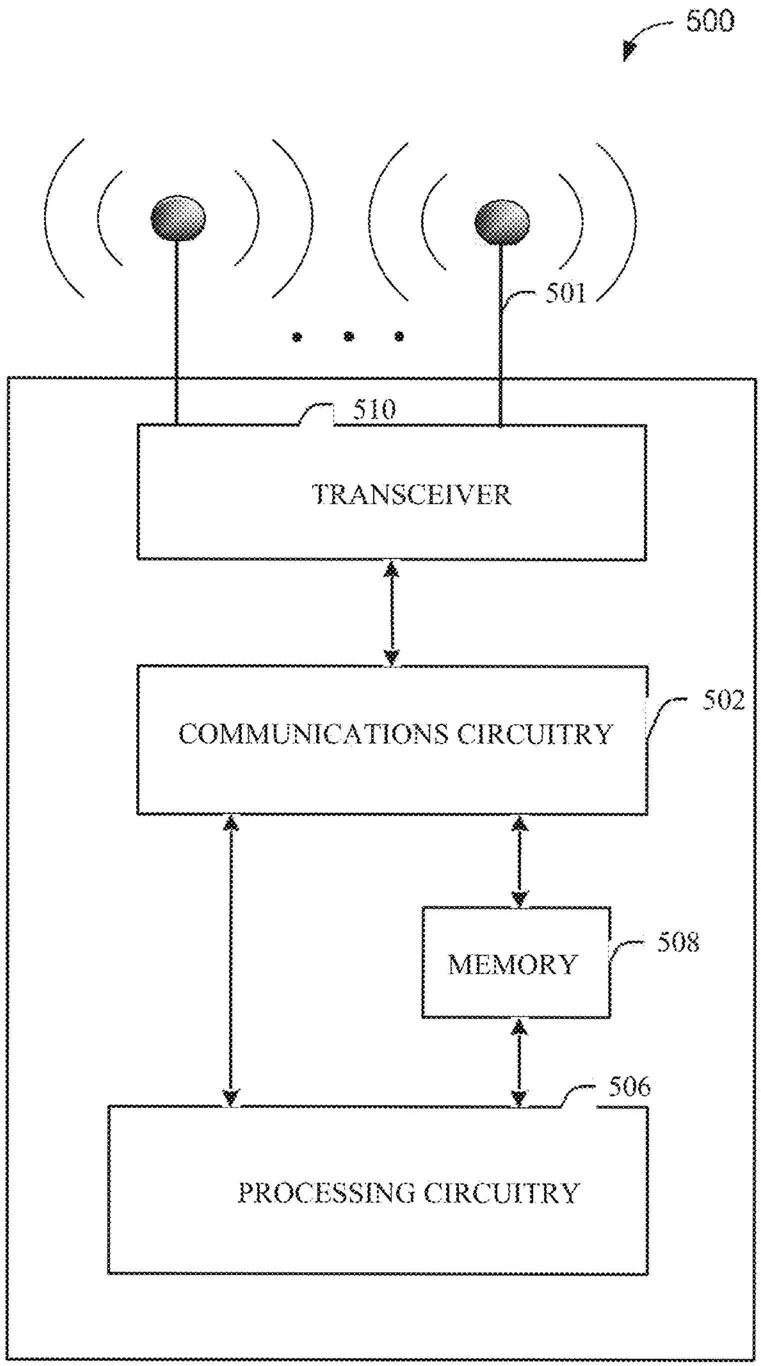
FIG. 5 depicts an embodiment of a functional diagram of a wireless communication device, in accordance with one or more example embodiments of the present disclosure.

FIG. 5 shows a functional diagram of an exemplary communication station 500, in accordance with one or more example embodiments of the present disclosure. In one embodiment, FIG. 5 illustrates a functional block diagram of a communication station that may be suitable for use as an AP 1005 (FIG. 1A) or a user device 1028 (FIG. 1A) in accordance with some embodiments. The communication station 500 may also be suitable for use as other user device(s) 1020 such as the user devices 1024 and/or 1026. The user devices 1024 and/or 1026 may include, e.g., a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device.

Figure 6:
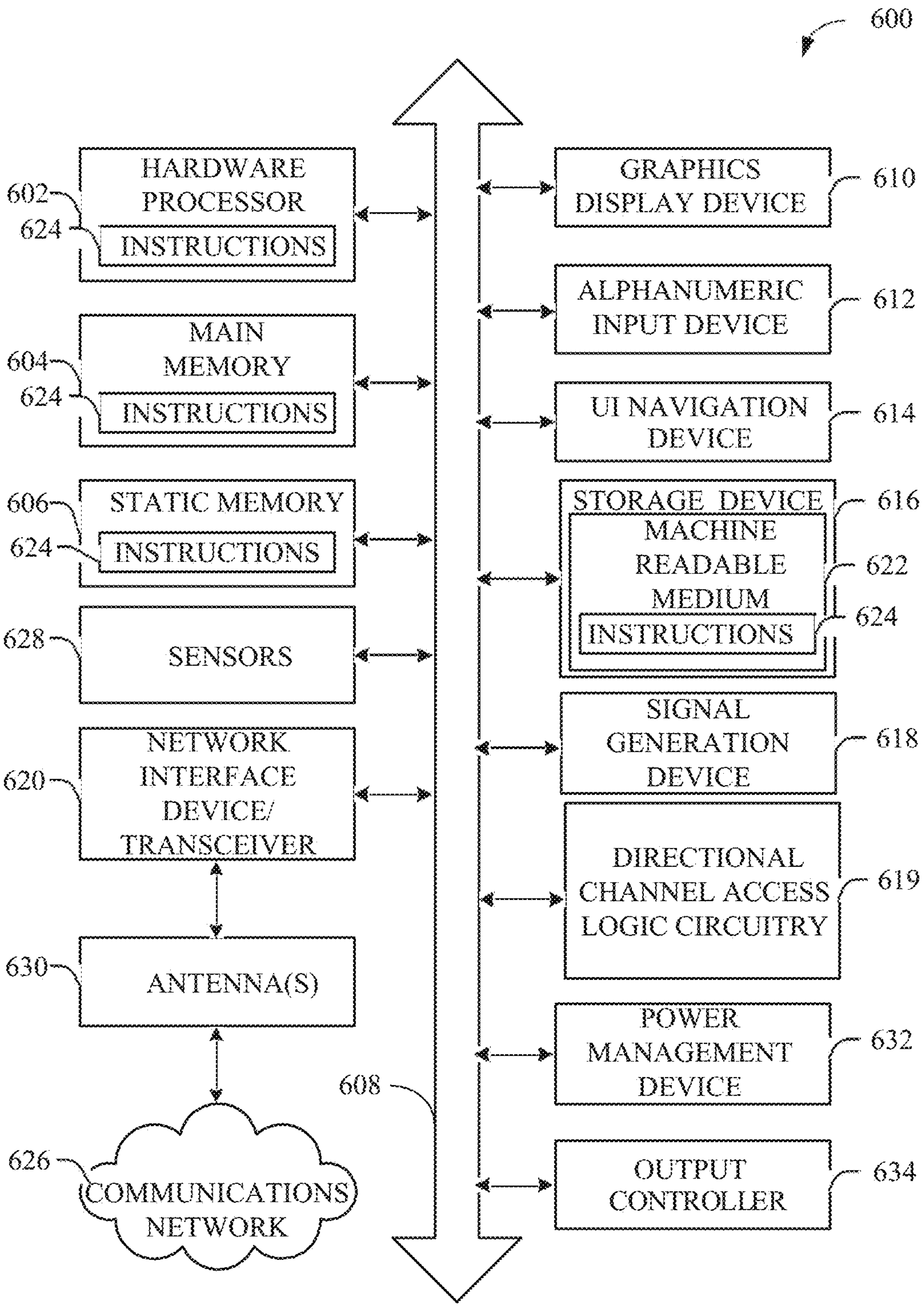
FIG. 6 depicts an embodiment of a block diagram of a machine upon which any of one or more techniques may be performed, in accordance with one or more embodiments.

FIG. 6 illustrates a block diagram of an example of a machine 600 or system upon which any one or more of the techniques (e.g., methodologies) discussed herein may be performed. For instance, the machine may comprise an AP such as the AP 1005 and/or one of the user devices 1020 shown in FIG. 1A. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via one or more interlinks (e.g., buses or high speed interconnects) 608. Note that the single set of interlinks 608 may be representative of the physical interlinks in some embodiments but is not representative of the physical interlinks 608 in other embodiments. For example, the main memory 604 may couple directly with the hardware processor 602 via high speed interconnects or a main memory bus. The high speed interconnects typically connect two devices and the bus is generally designed to interconnect two or more devices and include an arbitration scheme to provide fair access to the bus by the two or more devices.

The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a directional channel access logic circuitry 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB)), parallel, or other wired or wireless (e.g., infrared (IR), near field communication (NFC), etc.) connection to communicate with or control one or more peripheral devices (e.g., a printer, a card reader, etc.). The operations in accordance with one or more example embodiments of the present disclosure may be carried out by a baseband processor such as the baseband processing circuitry 1218 and/or 1248 shown in FIG. 1C. The baseband processor may be configured to generate corresponding baseband signals. The baseband processor may further include physical layer (PHY) and medium access control layer (MAC) circuitry, and may further interface with the hardware processor 602 for generation and processing of the baseband signals and for controlling operations of the main memory 604, the storage device 616, and/or the directional channel access logic circuitry 619. The baseband processor may be provided on a single radio card, a single chip, or an integrated circuit (IC).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The directional channel access logic circuitry 619 may carry out or perform any of the operations and processes in relation to performing directional channel access by an AP MLD or a non-AP MLD in a 60 GHz channel or the like (e.g., flowchart 4000 shown in FIG. 4A and flowchart 4100 shown in FIG. 4B) described and shown above. It is understood that the above are only a subset of what the directional channel access logic circuitry 619 may be configured to perform and that other functions included throughout this disclosure may also be performed by the directional channel access logic circuitry 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 7:
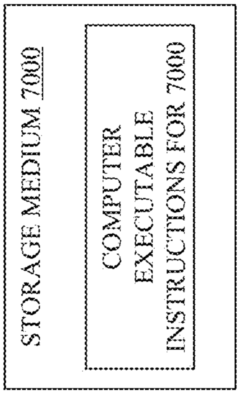
FIGS. 7-8 depict embodiments of a computer-readable storage medium and a computing platform to implement directional channel access logic circuitry.

FIG. 7 illustrates an example of a storage medium 7000 to store directional channel access logic such as logic to implement the directional channel access logic circuitry 619 shown in FIG. 6 and/or the other logic discussed herein to perform directional channel access via, e.g., directional CCAs or combinations of quasi-omni CCAs and directional CCAs. Storage medium 7000 may comprise an article of manufacture. In some examples, storage medium 7000 may include any non-transitory computer readable medium or machine-readable medium, such as an optical, magnetic or semiconductor storage. Storage medium 7000 may store diverse types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

Figure 8:
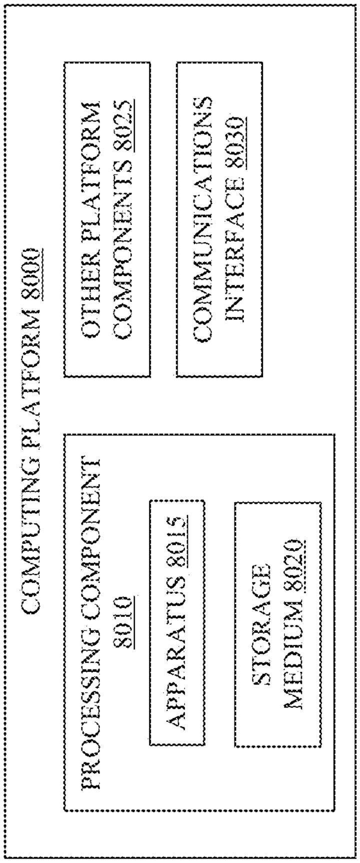

FIG. 8 illustrates an example computing platform 8000 such as the MLD STAs 1210, 1230, 1290, 1292, 1294, 1296, and 1298 in FIG. 1A. In some examples, as shown in FIG. 8, computing platform 8000 may include a processing component 8010, other platform components or a communications interface 8030 such as the wireless network interfaces 1222 and 1252 shown in FIG. 1A. According to some examples, computing platform 8000 may be a computing device such as a server in a system such as a data center or server farm that supports a manager or controller for managing configurable computing resources as mentioned above.

According to some examples, processing component 8010 may execute processing operations or logic for apparatus 8015 described herein. Processing component 8010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits (ICs), application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 8020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. While discussions herein describe elements of embodiments as software elements and/or hardware elements, decisions to implement an embodiment using hardware elements and/or software elements may vary in accordance with any number of design considerations or factors, such as desired computational rate, power levels, heat tolerances, processing cycle budget, input data rates, output data rates, memory resources, data bus speeds and other design or performance constraints.

In some examples, other platform components 8025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., universal serial bus (USB) memory), solid state drives (SSD) and any other type of storage media suitable for storing information.

In some examples, communications interface 8030 may include logic and/or features to support a communication interface. For these examples, communications interface 8030 may include one or more communication interfaces that operate according to various communication protocols or standards to communicate over direct or network communication links. Direct communications may occur via use of communication protocols or standards described in one or more industry standards (including progenies and variants) such as those associated with the Peripheral Component Interconnect (PCI) Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 8000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, various embodiments of the computing platform 8000 may include or exclude functions and/or specific configurations of the computing platform 8000 described herein.

The components and features of computing platform 8000 may comprise any combination of discrete circuitry, ASICs, logic gates and/or single chip architectures. Further, the features of computing platform 8000 may comprise microcontrollers, programmable logic arrays and/or microprocessors or any combination of the foregoing where suitably appropriate. Note that hardware, firmware and/or software elements may be collectively or individually referred to herein as "logic".

One or more aspects of at least one example may comprise representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

Advantages of Some Embodiments

Several embodiments have one or more potentially advantages effects. For instance, use of directional channel access with a combination of quasi-omni CCAs and directional CCAs, advantageously add flexibility and spectrum utilization efficiency. Use of directional channel access with directional CCAs, advantageously increases spectrum utilization efficiency by avoiding energy or packet detection of signals that would not interfere with a pending transmission. Use of directional channel access with directional CCAs, advantageously facilitates the transmission of multiple STAs concurrently in non-interfering directions or sectors. Maintaining and processing retry counts per sector and contention access windows per access category per sector, advantageously increases spectrum utilization by allowing multiple communications that would not be possible with a single retry count per sector and contention access window per access category per sector. Maintaining and processing retry counts and contention windows per access category for quasi-omni access in addition to the per sector retry counts and contention windows per access category, advantageously increases flexibility to reduce the maintenance requirements to monitor and perform backoff procedures with retry counts and contention windows per access category for multiple sectors.

Examples of Further Embodiments

The following examples pertain to further embodiments. Specifics in the examples may be used anywhere in one or more embodiments.

Example 1 is an apparatus comprising: a memory; and logic circuitry of a multilink device coupled with the memory to: place one or more protocol data units (PDUs) in a transmit queue for transmission, at least a first PDU of the one or more PDUs indicating an uplink (UL) transmission opportunity (TxOP) for a station (STA); perform a directional clear channel assessment (CCA) for a first sector of a 60 gigahertz (GHz) link, the directional CCA to determine only if the 60 GHz link in the first sector is busy or idle; determine the directional CCA indicates idle for the 60 GHz link in the first sector; cause transmission of the first PDU to the STA via the 60 GHz link in the first sector in response to the directional CCA indication of idle; and receive an acknowledgement (ACK) of receipt of the PDU from the STA. Example 2 is the apparatus of Example 1, wherein the logic circuitry comprises baseband processing circuitry and further comprising a radio coupled with the baseband processing circuitry, and one or more antennas coupled with the radio to transmit the PDU. Example 3 is the apparatus of Example 1, the logic circuitry to further perform a directional CCA for a second sector of the 60 GHz link. Example 4 is the apparatus of Example 3, the logic circuitry to further determine the directional CCA indicates idle for the second sector of the 60 GHz link and to cause transmission of a second PDU of the one or more PDUs to a second STA via the second sector of the 60 GHz link based on the directional CCA indication of idle. Example 5 is the apparatus of Example 4, wherein the logic circuitry of the multilink device communicates via the first sector and the second sector independently. Example 6 is the apparatus of Example 1, wherein the UL TxOP for the STA is trigger based and the first PDU comprises a trigger frame. Example 7 is the apparatus of Example 6, wherein the trigger frame comprises a frame control field, the frame control field comprises a common info field, and the common info field comprises a carrier sense (CS) required field. Example 8 is the apparatus of Example 7, the CS required field to comprise a one bit value, the one bit value to comprise a logical one to indicate that the STA can transmit a response to the trigger frame without performing a CCA or comprise a logical zero to indicate that the STA must perform a CCA prior to transmitting a response to the trigger frame. Example 9 is the apparatus of Example 1, wherein the UL TxOP for the STA comprises a target wake time (TWT) service period (SP) assignment for the STA. Example 10 is the apparatus of Example 1, the logic circuitry to maintain at least one retry counter per access category per sector and at least one contention window per access category per sector. Example 11 is the apparatus of Example 10, the logic circuitry to further maintain, for quasi-omni operation, at least one retry counter per access category and at least one contention window per access category. Example 12 is the apparatus of Example 10, the logic circuitry to perform directional CCA in each sector to be used for a multiple input, multiple output (MIMO) transmission and to only initiate the MIMO transmission after all sectors to be used for the MIMO transmission are available for transmission. Example 13 is the apparatus of Example 1, the logic circuitry to maintain at least one retry counter per access category and at least one contention window per access category, wherein communications in all sectors share the at least one retry counter per access category and the at least one contention window per access category. Example 14 is the apparatus of Example 1, the logic circuitry, after performing directional CCA in a set of one or more sectors and obtaining a TxOP, to only transmit in the set of one or more sectors during the TxOP.

Example 15. A non-transitory computer-readable medium, comprising instructions, which when executed by a processor, cause the processor to perform operations to: place one or more protocol data units (PDUs) in a transmit queue for transmission, at least a first PDU of the one or more PDUs indicating an uplink (UL) transmission opportunity (TxOP) for a station (STA); perform a directional clear channel assessment (CCA) for a first sector of a 60 gigahertz (GHz) link, the directional CCA to determine only if the 60 GHz link in the first sector is busy or idle; determine the directional CCA indicates idle for the 60 GHz link in the first sector; cause transmission of the first PDU to the STA via the 60 GHz link in the first sector based on the directional CCA indication of idle; and receive an acknowledgement (ACK) of receipt of the PDU from the STA. Example 16 is the non-transitory computer-readable medium of Example 15, the operations to further perform a directional CCA for a second sector of the 60 GHz link. Example 17 is the non-transitory computer-readable medium of Example 16, the operations to further determine the directional CCA indicates idle for the second sector of the 60 GHz link and to cause transmission of a second PDU of the one or more PDUs to a second STA via the second sector of the 60 GHz link based on the directional CCA indication of idle. Example 18 is the non-transitory computer-readable medium of Example 17, the operations to further communicate via the first sector and the second sector independently. Example 19 is the non-transitory computer-readable medium of Example 15, wherein the UL TxOP for the STA is trigger based and the first PDU comprises a trigger frame. Example 20 is the non-transitory computer-readable medium of Example 19, wherein the trigger frame comprises a frame control field, the frame control field comprises a common info field, and the common info field comprises a carrier sense (CS) required field. Example 21 is the non-transitory computer-readable medium of Example 20, the CS required field to comprise a one bit value, the one bit value to comprise a logical one to indicate that the STA can transmit a response to the trigger frame without performing a CCA or comprise a logical zero to indicate that the STA must perform a CCA prior to transmitting a response to the trigger frame. Example 22 is the non-transitory computer-readable medium of Example 15, wherein the UL TxOP for the STA comprises a target wake time (TWT) service period (SP) assignment for the STA. Example 23 is the non-transitory computer-readable medium of Example 15, the operations to further maintain at least one retry counter per access category per sector and at least one contention window per access category per sector. Example 24 is the non-transitory computer-readable medium of Example 23, the operations to further maintain, for quasi-omni operation, at least one retry counter per access category and at least one contention window per access category. Example 25 is the non-transitory computer-readable medium of Example 23, the operations to further perform directional CCA in each sector to be used for a multiple input, multiple output (MIMO) transmission and to only initiate the MIMO transmission after all sectors to be used for the MIMO transmission are available for transmission. Example 26 is the non-transitory computer-readable medium of Example 15, the operations to further maintain at least one retry counter per access category and at least one contention window per access category, wherein communications in all sectors share the at least one retry counter per access category and the at least one contention window per access category. Example 27 is the non-transitory computer-readable medium of Example 15, the operations to further, after performing directional CCA in a set of one or more sectors and obtaining a TxOP, only transmit in the set of one or more sectors during the TxOP.

Example 28 is a method comprising: placing one or more protocol data units (PDUs) in a transmit queue for transmission, at least a first PDU of the one or more PDUs indicating an uplink (UL) transmission opportunity (TxOP) for a station (STA); performing a directional clear channel assessment (CCA) for a first sector of a 60 gigahertz (GHz) link, the directional CCA to determine only if the 60 GHz link in the first sector is busy or idle; determining the directional CCA indicates idle for the 60 GHz link in the first sector; causing transmission of the first PDU to the STA via the 60 GHz link in the first sector based on the directional CCA indication of idle; and receiving an acknowledgement (ACK) of receipt of the PDU from the STA. Example 29 is the method of Example 28, further comprising performing a directional CCA for a second sector of the 60 GHz link. Example 30 is the method of Example 29, further comprising determining the directional CCA indicates idle for the second sector of the 60 GHz link and to cause transmission of a second PDU of the one or more PDUs to a second STA via the second sector of the 60 GHz link based on the directional CCA indication of idle. Example 31 is the method of Example 30, further comprising communicating via the first sector and the second sector independently. Example 32 is the method of Example 28, wherein the UL TxOP for the STA is trigger based and the first PDU comprises a trigger frame. Example 33 is the method of Example 32, wherein the trigger frame comprises a frame control field, the frame control field comprises a common info field, and the common info field comprises a carrier sense (CS) required field. Example 34 is the method of Example 33, the CS required field to comprise a one bit value, the one bit value to comprise a logical one to indicate that the STA can transmit a response to the trigger frame without performing a CCA or comprise a logical zero to indicate that the STA must perform a CCA prior to transmitting a response to the trigger frame. Example 35 is the method of Example 28, wherein the UL TxOP for the STA comprises a target wake time (TWT) service period (SP) assignment for the STA. Example 36 is the method of Example 28, further comprising maintaining at least one retry counter per access category per sector and at least one contention window per access category per sector. Example 37 is the method of Example 36, further comprising maintaining, for quasi-omni operation, at least one retry counter per access category and at least one contention window per access category. Example 38 is the method of Example 36, further comprising performing directional CCA in each sector to be used for a multiple input, multiple output (MIMO) transmission and to only initiate the MIMO transmission after all sectors to be used for the MIMO transmission are available for transmission. Example 39 is the method of Example 28, further comprising maintaining at least one retry counter per access category and at least one contention window per access category, wherein communications in all sectors share the at least one retry counter per access category and the at least one contention window per access category. Example 40 is the method of Example 28, further comprising, after performing directional CCA in a set of one or more sectors and obtaining a TxOP, only transmitting in the set of one or more sectors during the TxOP.

Example 41 is an apparatus comprising: a means for placing one or more protocol data units (PDUs) in a transmit queue for transmission, at least a first PDU of the one or more PDUs indicating an uplink (UL) transmission opportunity (TxOP) for a station (STA); a means for performing a directional clear channel assessment (CCA) for a first sector of a 60 gigahertz (GHz) link, the directional CCA to determine only if the 60 GHz link in the first sector is busy or idle; a means for determining the directional CCA indicates idle for the 60 GHz link in the first sector; a means for causing transmission of the first PDU to the STA via the 60 GHz link in the first sector based on the directional CCA indication of idle; and a means for receiving an acknowledgement (ACK) of receipt of the PDU from the STA. Example 42 is the apparatus of Example 41, further comprising a means for performing a directional CCA for a second sector of the 60 GHz link. Example 43 is the apparatus of Example 42, further comprising a means for determining the directional CCA indicates idle for the second sector of the 60 GHz link and to cause transmission of a second PDU of the one or more PDUs to a second STA via the second sector of the 60 GHz link based on the directional CCA indication of idle. Example 44 is the apparatus of Example 43, further comprising a means for communicating via the first sector and the second sector independently. Example 45 is the apparatus of Example 41, wherein the UL TxOP for the STA is trigger based and the first PDU comprises a trigger frame. Example 46 is the apparatus of Example 45, wherein the trigger frame comprises a frame control field, the frame control field comprises a common info field, and the common info field comprises a carrier sense (CS) required field. Example 47 is the apparatus of Example 46, the CS required field to comprise a one bit value, the one bit value to comprise a logical one to indicate that the STA can transmit a response to the trigger frame without performing a CCA or comprise a logical zero to indicate that the STA must perform a CCA prior to transmitting a response to the trigger frame. Example 48 is the apparatus of Example 41, wherein the UL TxOP for the STA comprises a target wake time (TWT) service period (SP) assignment for the STA. Example 49 is the apparatus of Example 41, further comprising a means for maintaining at least one retry counter per access category per sector and at least one contention window per access category per sector. Example 50 is the apparatus of Example 49, further comprising a means for maintaining, for quasi-omni operation, at least one retry counter per access category and at least one contention window per access category. Example 51 is the apparatus of Example 49, further comprising a means for performing directional CCA in each sector to be used for a multiple input, multiple output (MIMO) transmission and to only initiate the MIMO transmission after all sectors to be used for the MIMO transmission are available for transmission. Example 52 is the apparatus of Example 41, further comprising a means for maintaining at least one retry counter per access category and at least one contention window per access category, wherein communications in all sectors share the at least one retry counter per access category and the at least one contention window per access category. Example 53 is the apparatus of Example 41, further comprising, after performing directional CCA in a set of one or more sectors and obtaining a TxOP, a means for only transmitting in the set of one or more sectors during the TxOP.

Example 54 is an apparatus comprising: a memory; and logic circuitry of a non-AP multilink device (MLD) coupled with the memory to: receive a packet from a physical layer (PHY) indicating an uplink (UL) transmission opportunity (TxOP); place a protocol data unit (PDU) in a transmit queue for transmission during the TxOP to an AP MLD on a 60 gigahertz (GHz) link via a first sector; perform a directional clear channel assessment (CCA) for the 60 GHz link in the first sector, the directional CCA to determine only if the 60 GHz link in the first sector is busy or idle; determine the directional CCA indicates idle for the 60 GHz link in the first sector; and cause transmission of the PDU to the AP MLD via the 60 GHz link in the first sector based on the directional CCA indication of idle. Example 55 is the apparatus of Example 54, wherein the logic circuitry comprises baseband processing circuitry and further comprising a radio coupled with the baseband processing circuitry, and one or more antennas coupled with the radio to transmit the PDU. Example 56 is the apparatus of Example 54, wherein the UL TxOP for the STA is trigger based and the first PDU comprises a trigger frame. Example 57 is the apparatus of Example 56, wherein the trigger frame comprises a frame control field, the frame control field comprises a common info field, and the common info field comprises a carrier sense (CS) required field. Example 58 is the apparatus of Example 57, the CS required field to comprise a one bit value, the one bit value to comprise a logical one to indicate that the STA can transmit a response to the trigger frame without performing a CCA or comprise a logical zero to indicate that the STA must perform a CCA prior to transmitting a response to the trigger frame. Example 59 is the apparatus of Example 54, wherein the UL TxOP for the STA comprises a target wake time (TWT) service period (SP) assignment for the STA. Example 60 is the apparatus of Example 54, the logic circuitry to maintain at least one retry counter per access category and at least one contention window per access category. Example 61 is the apparatus of Example 54, the logic circuitry, after performing directional CCA in the first sector and obtaining a TxOP, to only transmit in the first sector during the TxOP.

Example 62 is a non-transitory computer-readable medium, comprising instructions, which when executed by a processor, cause the processor to perform operations to: receive a packet from a physical layer (PHY) indicating an uplink (UL) transmission opportunity (TxOP); place a protocol data unit (PDU) in a transmit queue for transmission during the TxOP to an AP MLD on a 60 gigahertz (GHz) link via a first sector; perform a directional clear channel assessment (CCA) for the 60 GHz link in the first sector, the directional CCA to determine only if the 60 GHz link in the first sector is busy or idle; determine the directional CCA indicates idle for the 60 GHz link in the first sector; and cause transmission of the PDU to the AP MLD via the 60 GHz link in the first sector based on the directional CCA indication of idle. Example 63 is the non-transitory computer-readable medium of Example 62, wherein the UL TxOP for the STA is trigger based and the first PDU comprises a trigger frame. Example 64 is the non-transitory computer-readable medium of Example 63, wherein the trigger frame comprises a frame control field, the frame control field comprises a common info field, and the common info field comprises a carrier sense (CS) required field. Example 65 is the non-transitory computer-readable medium of Example 64, the CS required field to comprise a one bit value, the one bit value to comprise a logical one to indicate that the STA can transmit a response to the trigger frame without performing a CCA or comprise a logical zero to indicate that the STA must perform a CCA prior to transmitting a response to the trigger frame. Example 66 is the non-transitory computer-readable medium of Example 62, wherein the UL TxOP for the STA comprises a target wake time (TWT) service period (SP) assignment for the STA. Example 67 is the non-transitory computer-readable medium of Example 62, wherein the operations further comprise operations to maintain at least one retry counter per access category and at least one contention window per access category. Example 68 is the non-transitory computer-readable medium of Example 62, wherein, after performing directional CCA in the first sector and obtaining a TxOP, the operations further comprise operations to only transmit in the first sector during the TxOP.

Example 69 is a method comprising: receiving a packet from a physical layer (PHY) indicating an uplink (UL) transmission opportunity (TxOP); placing a protocol data unit (PDU) in a transmit queue for transmission during the TxOP to an AP MLD on a 60 gigahertz (GHz) link via a first sector; performing a directional clear channel assessment (CCA) for the 60 GHz link in the first sector, the directional CCA to determine only if the 60 GHz link in the first sector is busy or idle; determining the directional CCA indicates idle for the 60 GHz link in the first sector; and causing transmission of the PDU to the AP MLD via the 60 GHz link in the first sector based on the directional CCA indication of idle. Example 70 is the method of Example 69, wherein the UL TxOP for the STA is trigger based and the first PDU comprises a trigger frame. Example 71 is the method of Example 70, wherein the trigger frame comprises a frame control field, the frame control field comprises a common info field, and the common info field comprises a carrier sense (CS) required field. Example 72 is the method of Example 71, the CS required field to comprise a one bit value, the one bit value to comprise a logical one to indicate that the STA can transmit a response to the trigger frame without performing a CCA or comprise a logical zero to indicate that the STA must perform a CCA prior to transmitting a response to the trigger frame. Example 73 is the method of Example 69, wherein the UL TxOP for the STA comprises a target wake time (TWT) service period (SP) assignment for the STA. Example 74 is the method of Example 69, wherein the operations further comprise operations to maintain at least one retry counter per access category and at least one contention window per access category. Example 75 is the method of Example 69, wherein, after performing directional CCA in the first sector and obtaining a TxOP, the method further comprises only transmitting in the first sector during the TxOP.

Example 76 is an apparatus comprising: a means for receiving a packet from a physical layer (PHY) indicating an uplink (UL) transmission opportunity (TxOP); a means for placing a protocol data unit (PDU) in a transmit queue for transmission during the TxOP to an AP MLD on a 60 gigahertz (GHz) link via a first sector; a means for performing a directional clear channel assessment (CCA) for the 60 GHz link in the first sector, the directional CCA to determine only if the 60 GHz link in the first sector is busy or idle; a means for determining the directional CCA indicates idle for the 60 GHz link in the first sector; and a means for causing transmission of the PDU to the AP MLD via the 60 GHz link in the first sector based on the directional CCA indication of idle. Example 77 is the apparatus of Example 76, wherein the UL TxOP for the STA is trigger based and the first PDU comprises a trigger frame. Example 78 is the apparatus of Example 77, wherein the trigger frame comprises a frame control field, the frame control field comprises a common info field, and the common info field comprises a carrier sense (CS) required field. Example 79 is the apparatus of Example 78, the CS required field to comprise a one bit value, the one bit value to comprise a logical one to indicate that the STA can transmit a response to the trigger frame without performing a CCA or comprise a logical zero to indicate that the STA must perform a CCA prior to transmitting a response to the trigger frame. Example 80 is the apparatus of Example 76, wherein the UL TxOP for the STA comprises a target wake time (TWT) service period (SP) assignment for the STA. Example 81 is the apparatus of Example 76, further comprising a means for maintaining at least one retry counter per access category and at least one contention window per access category. Example 82 is the apparatus of Example 76, wherein, after performing directional CCA in the first sector and obtaining a TxOP, further comprises a means for only transmitting in the first sector during the TxOP.

What is claimed is:

1. An apparatus comprising:

a memory; and circuitry of a multilink device coupled with the memory to:

place one or more protocol data units (PDUs) in a transmit queue for transmission, at least a first PDU of the one or more PDUs indicating an uplink (UL) transmission opportunity (TxOP) for a station (STA);

maintain at least one retry counter per access category per sector and at least one contention window per access category per sector, the circuitry to maintain one or more variable retry counts per sector, wherein each retry count sets a limit on a number of retries for transmission;

perform a first directional clear channel assessment (CCA) for a first sector of a first channel within a range of 45 gigahertz (GHz) to 75 GHz, the first directional CCA to determine if the first channel in the first sector is busy or idle;

perform a second directional CCA for a second sector of the first channel;

cause concurrent transmission of the first PDU to the STA via the first sector of the first channel and a second PDU to a second STA via the second sector of the first channel; and receive an acknowledgement (ACK) of receipt of the first PDU from the STA.

2. The apparatus of claim 1, wherein the circuitry comprises baseband processing circuitry and further comprising a radio coupled with the baseband processing circuitry, and one or more antennas coupled with the radio to transmit the first PDU.

3. The apparatus of claim 1, the circuitry to further determine that the first directional CCA and the second directional CCA indicate that the first channel is idle.

4. The apparatus of claim 1, the circuitry to further generate the first PDU, the second PDU, or both with indications that directional CCA is not required.

5. The apparatus of claim 4, wherein the circuitry of the multilink device communicates via the first sector and the second sector independently.

6. The apparatus of claim 1, wherein the UL TxOP for the STA is trigger based and the first PDU comprises a trigger frame.

7. The apparatus of claim 6, wherein the trigger frame comprises a frame control field, the frame control field comprises a common info field, and the common info field comprises a CS required field.

8. The apparatus of claim 7, the CS required field to comprise a one bit value, the one bit value to comprise a logical one to indicate that the STA can transmit a response to the trigger frame without performing a CCA or comprise a logical zero to indicate that the STA must perform a CCA prior to transmitting a response to the trigger frame.

9. The apparatus of claim 1, wherein the UL TxOP for the STA comprises a target wake time (TWT) service period (SP) assignment for the STA.

10. The apparatus of claim 1, the circuitry to perform multiple input, multiple output (MIMO) beamforming for the transmission of the first PDU.

11. The apparatus of claim 1, the circuitry to further maintain, for quasi-omni operation, at least one retry counter per access category and at least one contention window per access category.

12. The apparatus of claim 1, the circuitry to perform directional CCA in each sector to be used for a multiple input, multiple output (MIMO) transmission and to only initiate the MIMO transmission after all sectors to be used for the MIMO transmission are available for transmission.

13. The apparatus of claim 1, the circuitry to maintain at least one retry counter per access category and at least one contention window per access category, wherein communications in all sectors share the at least one retry counter per access category and the at least one contention window per access category.

14. The apparatus of claim 1, the circuitry, after performing directional CCA in a set of one or more sectors and obtaining a TxOP, to only transmit in the set of one or more sectors during the TxOP.

15. A non-transitory computer-readable medium, comprising instructions, which when executed by a processor, cause the processor to perform operations to:

place one or more protocol data units (PDUs) in a transmit queue for transmission, at least a first PDU of the one or more PDUs indicating an uplink (UL) transmission opportunity (TxOP) for a station (STA);

maintain at least one retry counter per access category per sector and at least one contention window per access category per sector, the processor to maintain one or more variable retry counts per sector, wherein each retry count sets a limit on a number of retries for transmission;

perform a directional clear channel assessment (CCA) for a first sector of a first channel within a range of 45 gigahertz (GHz) to 75 GHz, the first directional CCA to determine if a link of the first channel in the first sector is busy or idle;

perform a second directional CCA for a second sector of the first channel; cause concurrent transmission of the first PDU to the STA via the first sector of the first channel and a second PDU to a second STA via the second sector of the first channel; and receive an acknowledgement (ACK) of receipt of the PDU from the STA.

16. The non-transitory computer-readable medium of claim 15, the operations to further perform the second directional CCA for second sector link for the second PDU.

17. The non-transitory computer-readable medium of claim 16, the operations to further determine the second directional CCA indicates idle for the second sector and to cause transmission of the second PDU of the one or more PDUs to the second STA via the second sector.

18. An apparatus comprising:

a memory; and circuitry of a non-AP multilink device (MLD) coupled with the memory to:

receive a packet from a physical layer (PHY) indicating an uplink (UL) transmission opportunity (TxOP);

place a first protocol data unit (PDU) in a transmit queue for transmission during the TxOP to an AP MLD via a first sector of a first channel within a range of 45 gigahertz (GHz) to 75 GHz;

maintain at least one retry counter per access category per sector and at least one contention window per access category per sector, the circuitry to maintain one or more variable retry counts per sector, wherein each retry count sets a limit on a number of retries for transmission;

perform a first directional clear channel assessment (CCA) for the first sector of the first channel, the first directional CCA to determine if the first channel in the first sector is busy or idle;

perform a second directional CCA for a second sector of the first channel; and cause concurrent transmission of the first PDU to the AP MLD via the first sector of the first channel and a second PDU to a second STA via the second sector of the first channel.

19. The apparatus of claim 18, wherein the circuitry comprises baseband processing circuitry and further comprising a radio coupled with the baseband processing circuitry, and one or more antennas coupled with the radio to transmit the first PDU.

20. The apparatus of claim 18, wherein the UL TxOP for the AP MLD is trigger based and the first PDU comprises a control frame.

21. The apparatus of claim 20, wherein the packet comprises a frame control field, the frame control field comprises a common info field, and the common info field comprises a CS required field.

22. The apparatus of claim 21, the CS required field to comprise a one bit value, the one bit value to comprise a logical one to indicate that the non-AP MLD can transmit a response to the trigger frame without performing a CCA or comprise a logical zero to indicate that the STA must perform a CCA prior to transmitting a response to the trigger frame.

23. A non-transitory computer-readable medium, comprising instructions, which when executed by a processor, cause the processor to perform operations to:

receive a packet from a physical layer (PHY) indicating an uplink (UL) transmission opportunity (TxOP);

place a protocol data unit (PDU) in a transmit queue for transmission during the TxOP to an AP MLD via a first sector of a first channel;

maintain at least one retry counter per access category per sector and at least one contention window per access category per sector, the processor to maintain one or more variable retry counts per sector, wherein each retry count sets a limit on a number of retries for transmission;

perform a first directional clear channel assessment (CCA) for the first sector of the first channel, the first directional CCA to determine if the first channel in the first sector is busy or idle;

perform a second directional CCA for a second sector of the first channel; and cause concurrent transmission of the first PDU to the AP MLD via the first sector of the first channel and a second PDU to a second STA via the second sector of the first channel.

24. The non-transitory computer-readable medium of claim 23, wherein the UL TxOP for the AP MLD is trigger based and the first PDU comprises a control frame.

25. The non-transitory computer-readable medium of claim 24, wherein the packet comprises a frame control field, the frame control field comprises a common info field, and the common info field comprises a CS required field.

* * * * *